Jan. 11, 1966 R. T. FENN ETAL 3,228,270
AUTOMATIC FEED MECHANISM FOR A MACHINE TOOL
Filed May 21, 1963 6 Sheets-Sheet 1

INVENTORS
RAYMOND T. FENN
ELIO F. D'ALOISIO
BY
ATTORNEYS

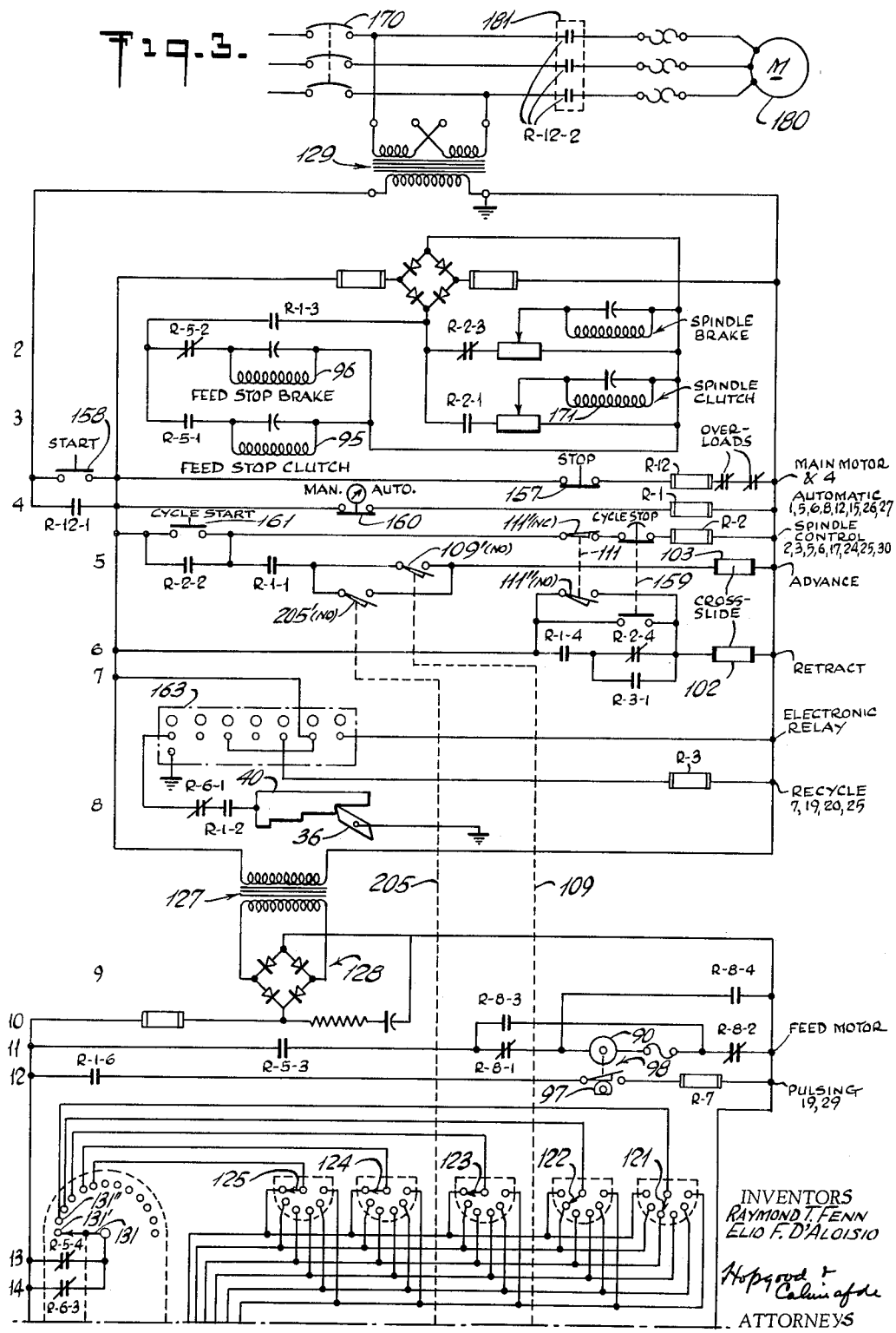

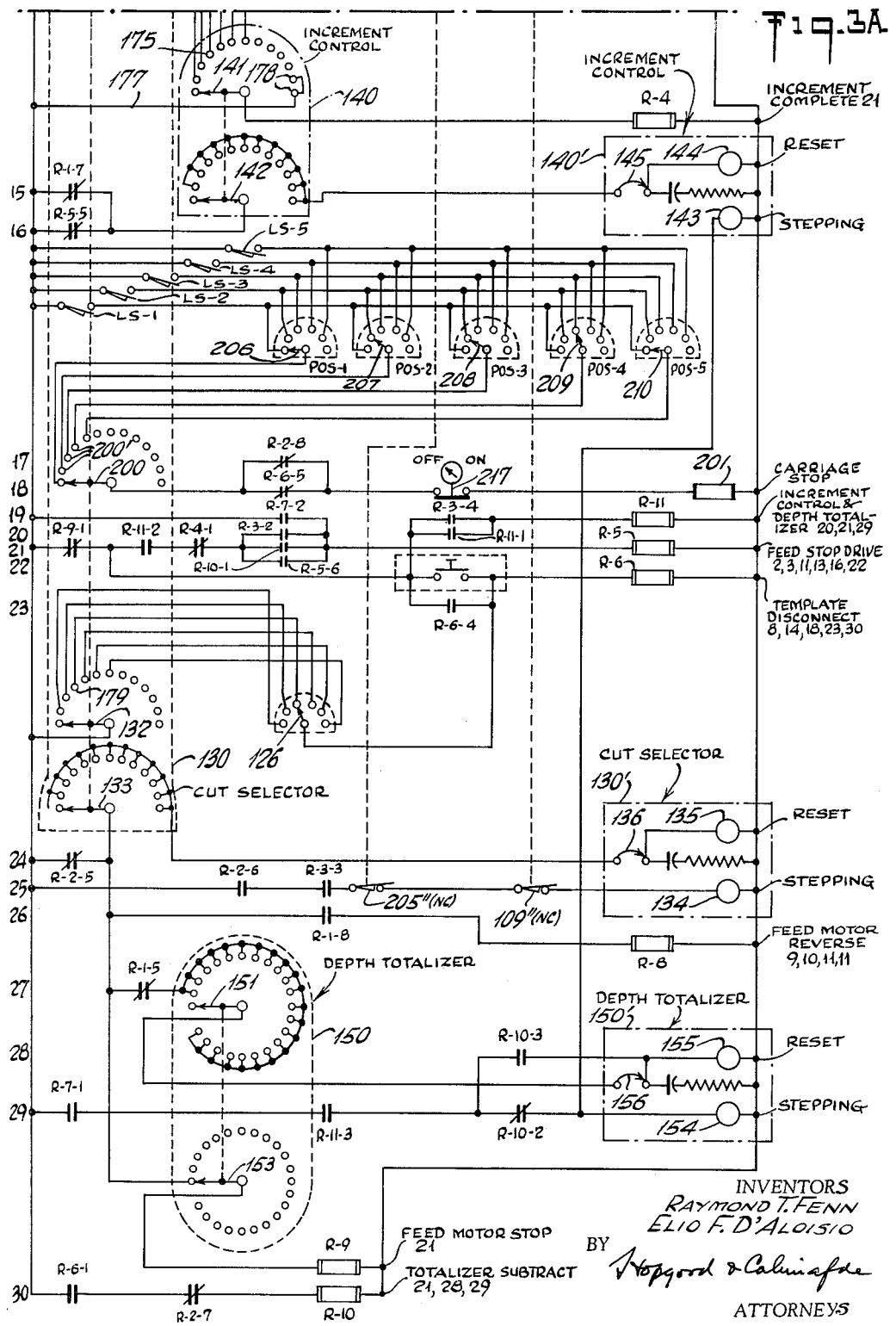

Jan. 11, 1966   R. T. FENN ETAL   3,228,270
AUTOMATIC FEED MECHANISM FOR A MACHINE TOOL
Filed May 21, 1963   6 Sheets-Sheet 4

INVENTORS
RAYMOND T. FENN
ELIO F. D'ALOISIO
BY
ATTORNEYS

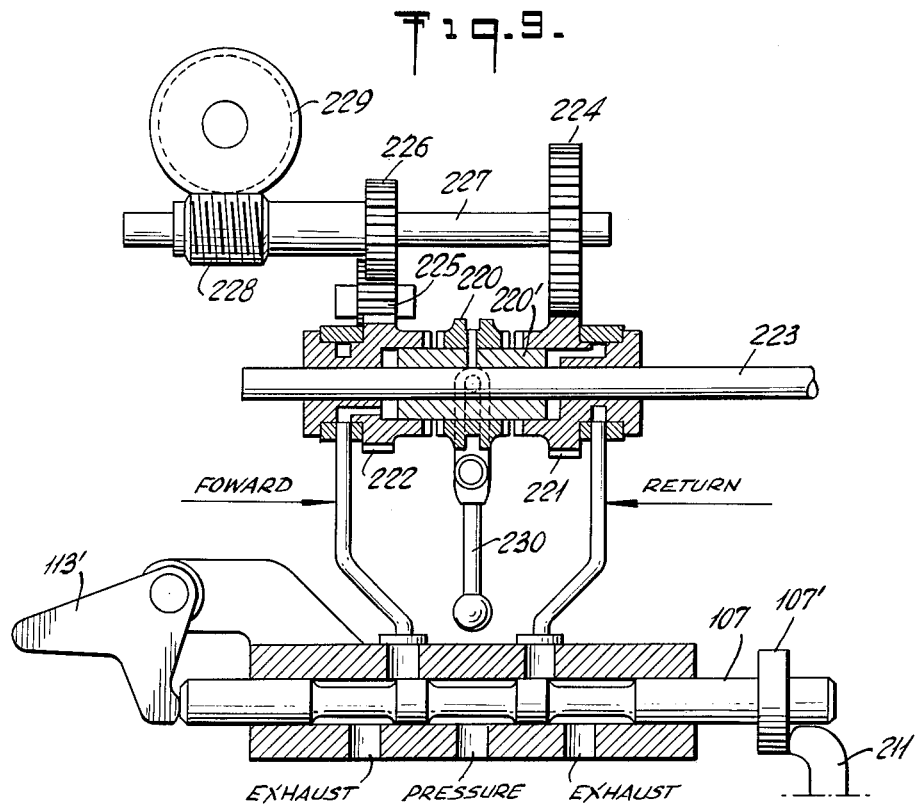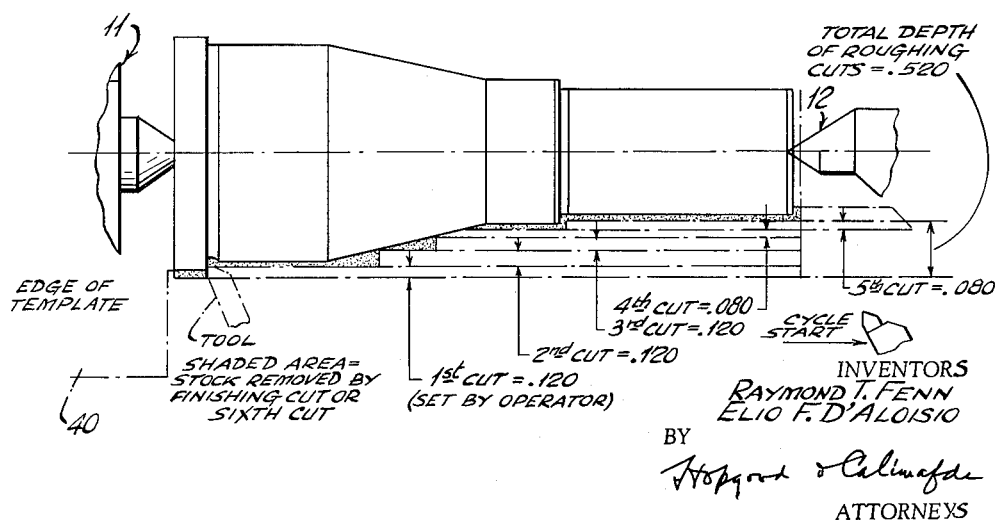

INVENTORS
RAYMOND T. FENN
ELIO F. D'ALOISIO
BY
Hopgood & Calimafde
ATTORNEYS

United States Patent Office 3,228,270
Patented Jan. 11, 1966

3,228,270
**AUTOMATIC FEED MECHANISM FOR
A MACHINE TOOL**
Raymond T. Fenn, Pleasant Valley, and Elio F. D'Aloisio,
East Hartford, Conn., assignors to The New Britain
Machine Company, New Britain, Conn., a corporation
of Connecticut
Filed May 21, 1963, Ser. No. 281,914
38 Claims. (Cl. 82—14)

This application is a continuation-in-part of our application Serial No. 749,802, filed July 21, 1958, and relates to contour-cutting machine tools and more specifically to copying lathes of the type shown, for example, and described in Von Zelewsky U.S. Patents Nos. 2,645,148, 2,645,149, and 2,693,125.

It is an object of the invention to provide an improved machine of the character indicated.

An object of the invention is to provide a multi-cut cycled lathe with novel means for preselecting the depth of each successive cut to be made on a given workpiece.

An object of the invention is to provide in a machine of the character indicated a novel organization whereby a plurality of rough cuts may be made on a workpiece to progressive preselected depths, for depths short of the depths ultimately to be copied, said mechanism having an automatic means for thereafter transferring tool-positioning control from the preselection mechanism to the template which may also take the form of a master workpiece to be copied.

A still further object of the invention is to provide an automatic recycling transverse mechanism for a lathe of the character indicated wherein the depth of cut or material removed per unit of traverse is automatically rendered substantially equal regardless of the depth of cut or length of traverse at a given depth.

An object of the invention is to provide, for a lathe of the character indicated, novel means for controlling automatic recycling of a tool-carrying traverse mechanism; that is, for controlling termination of a cutting traverse or pass and initiating return of the traverse mechanism to start position for a next cutting pass.

More particularly, it is intended to provide such recycling control as will function automatically according to the depth of cut being made during the cutting pass.

An object is to provide for control of recycling of the traverse mechanism by the template; more particularly, to use the template for controlling reversal of the traverse mechanism for cutting travel to return travel; further, to utilize the template and coacting tracer or follower for controlling the termination of each of successive roughing cut passes and initiating return of the traverse mechanism in accordance with the depth setting of the tool on the traverse mechanism.

An object of the invention is to provide, for a multi-cut cycled lathe of the character indicated, a plurality of depth-of-cut selectors respectively allocated to successive roughing cuts in the cycle and individually variably settable to select and store any of a plurality of different values of cutting depth for the related cutting pass of the traverse mechanism. According to this aspect of the invention, the cutting depth for a rough cutting pass will be incrementally automatically adjusted and the depth-of-cut selector allocated to the rough cutting pass will be selectively settable to manifest the number of increments of depth adjustment for the cutting pass.

It is an object of the invention to provide, for a multi-cut cycled lathe of the character indicated, means for programming start positions for successive cutting traverses during the cycle; more specifically, to provide for this purpose separate selectors respectively allocated to successive cutting traverses and individually selectively settable to select anyone of a plurality of start positions for the allocated cutting traverse.

It is a further specific object to achieve the previously stated specific objects with preselected digitally operated means for performing rough cuts, and with tracer-control means for performing a final cut.

Another specific object is to provide a multi-cut lathe with means for manually preselecting the number of cuts and the depth of each cut, means for totalizing all such preselected events, and means for resetting the totalizing means to zero at the end of the last cut.

Another object is to provide a multi-cut lathe wherein the machine cycle can be started and terminated at any predetermined point within the total carriage traverse required to finish a workpiece.

Another object is to provide a multi-cut lathe wherein the carriage may be caused to selectively execute a plurality of short carriage traverses of varying lengths within the total carriage traverse required to finish a workpiece.

Other objects and various further features of novelty and invention will be pointed out or will occur to those skilled in the art from a reading of the following specification in conjunction with the accompanying drawings. In said drawings, which show, for illustrative purposes only, a preferred form of the invention:

FIGS. 3 and 3A are electrical circuit diagrams illustrating control mechanism operative for controlling the machine of FIGS. 1 and 2;

FIG. 5 is a schematic view in elevation of a typical set-up for processing a workpiece having a tapered diameter in addition to square shoulders, and which may be finished by tracer-operated means.

Figure 6:
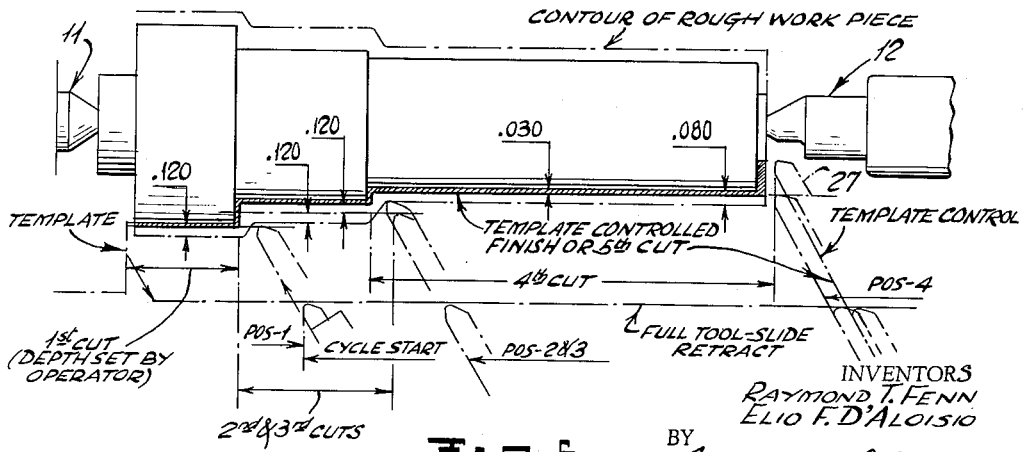

FIG. 6 is a schematic view in elevation of a typical set-up for processing a workpiece wherein the machine cycle starts in close proximity to the headstock, and wherein a plurality of relatively short carriage traverses or cut are to be performed at preselected points within the total carriage traverse required to finish the workpiece, and which total traverse may be finished by tracer operated means.

Figures 1, 1A, 2:
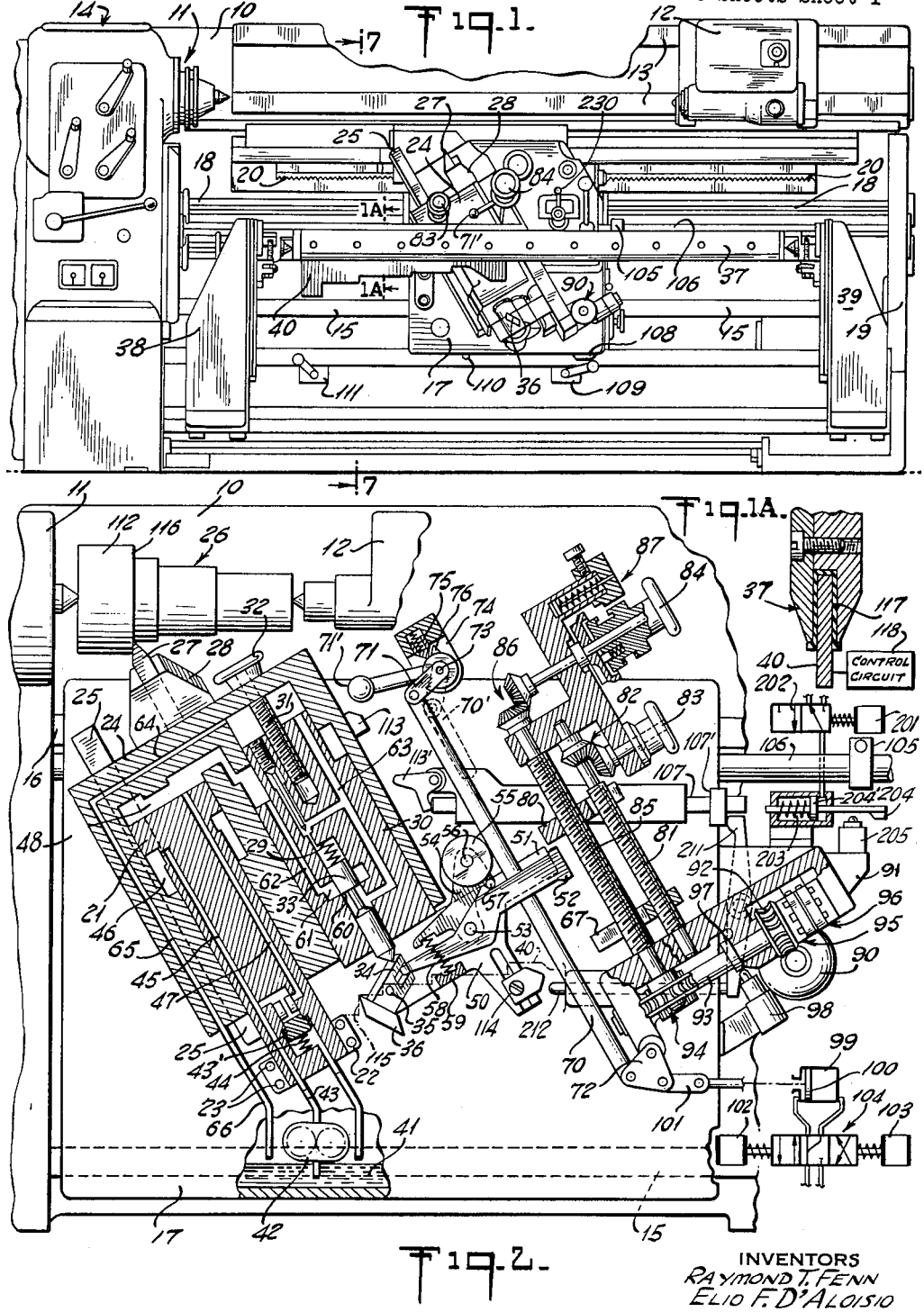
FIG. 1 is a front view in elevation of a copying lathe, embodying features of the invention, the view being taken from the operator's side.
FIG. 1A is an enlarged fragmentary sectional view in the plane 1A—1A of FIG. 1.
FIG. 2 is a view illustrating diagrammatically, partly in vertical longitudinal section and partly in side elevation, portions of the slide mechanism of the lathe of FIG. 1.
Figure 7:
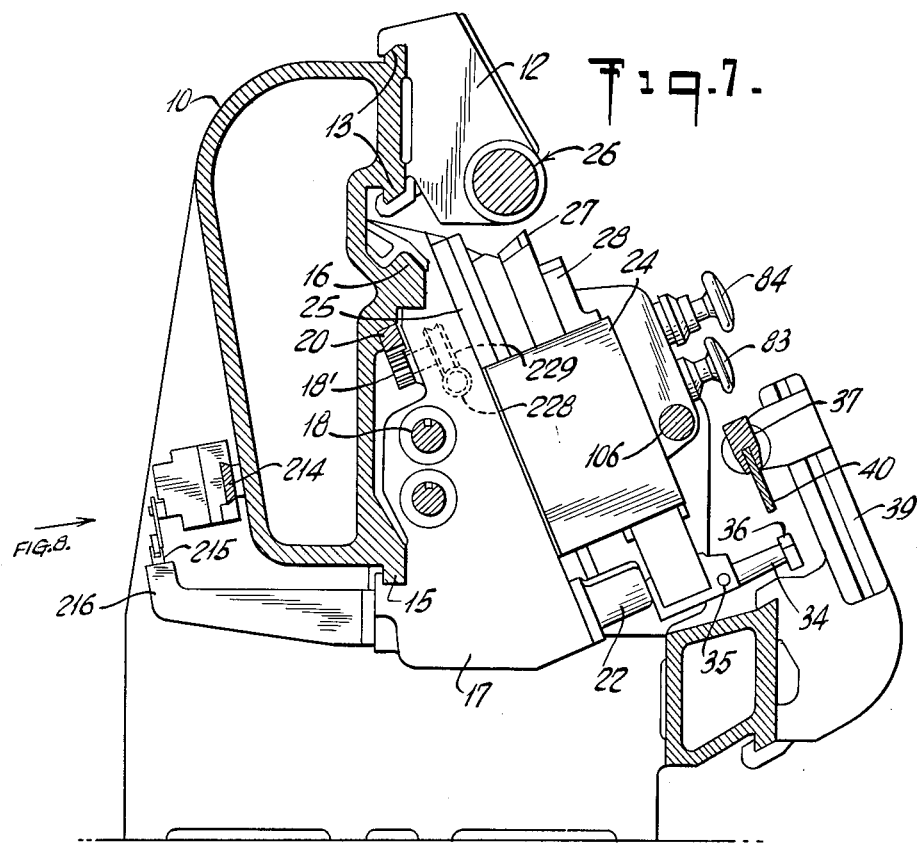

FIG. 7 is a transverse section of the copying lathe taken on line 7—7 of FIG. 1.

Figure 8:
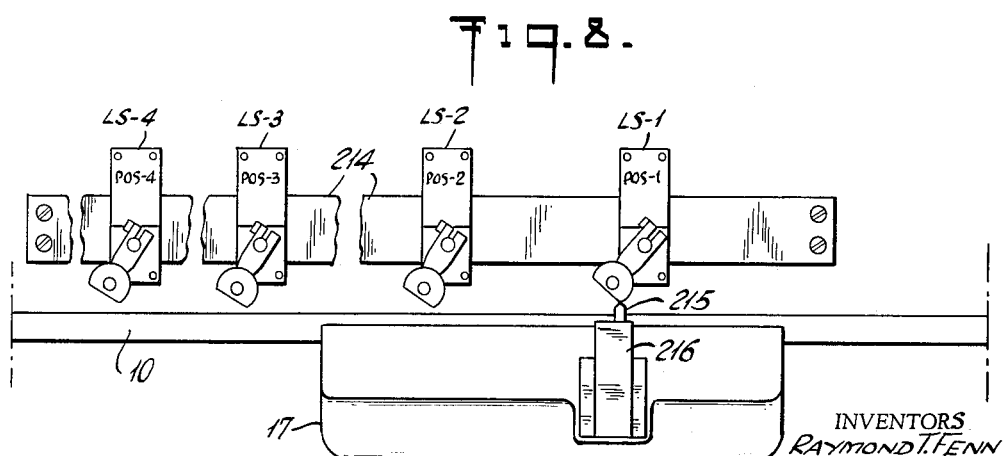

FIG. 8 is a view looking in the direction of the arrow 8 showing the arrangement of the limit switches which control the short traverses of the carriage.

FIG. 9 shows the part of the carriage drive and the clutch mechanism that controls the forward end return traverse of the carriage.

In order to more clearly understand the system of metal cutting in accordance with the present invention, and particularly in application to lathes, it may be stated that it is particularly adaptable for processing piece parts or shafts which generally have a plurality of progressively increasing diameters as a function of length; each said diameter may terminate in a substantially square shoulder, or the shaft may include a taper. With a copying lathe of the type disclosed herein, the copying slide, which carries the tool, is at an acute angle with the work-turning or spindle axis and the copying slide is inclined toward the headstock; thus, piece-parts can best be turned by mounting the template so that the increase in diameter is progressive from tailstock to headstock. This permits proper squaring of shoulders. Turning piece parts of this nature usually requires a plurality of roughing cuts of various lengths and depths, followed by a finish cut which is relatively light and which is traced from a template with the desired profile. It may be stated here that the cutting-tool point and the tracer point are in exact correspondence, so that the profile of the finished piece-part will be precisely the same as that of the template.

In accordance with our invention, we provide a copying lathe of this type with automatic programming means which permits setting up or preselecting a cycle of predetermined cutting events, so that the copying lathe will automatically range through a complete cycle and return to cycle-start position. A full program of work on any particular workpiece may consist of a plurality of roughing cuts to successive predetermined diameters, and a finishing cut traced from a template, all followed by automatic resetting of the tool back to the position necessary to make the first rough cut on the next workpiece. If desired, two indexible templates may be used for the last two traverses of the work to assure a more precise final-finish cut. The lathe may be set up for a multi-cut cycle in which the traverse carriage has a constant start position for each of successive cutting traverses and various termination positions for the cutting traverses. Such cycle may be referred to hereinafter as the normal multi-cut cycle or the constant start cycle. Alternatively, the lathe may also be set up so that the cycle start position, and successive short carriage traverses for a plurality of roughing cuts, may be performed at random selectively predetermined positions within the total traverse required for a template controlled finishing cut. The cycle of the lathe when so set up may be referred to as the selective short traverse cycle or as the variable start cycle.

In order that the sequences of a machine cycle will be more clearly understood, the longituding to and fro motion of the carriage will hereinafter be referred to as FORWARD TRAVERSE and RETURN TRAVERSE; and the up and down motion of the copying or tool slide will be hereinafter referred to as ADVANCE and RETRACT. Also, when a template profile is being traced the undulating or up and down motion of the copying slide is a function of forward carriage traverse; and the rapid carriage return and approach to feed speed are a function of the copying or tool slide retract and advance. The only exception in either case is when the lathe is under manual control.

Referring particularly to FIGS. 1, 2 and 6 of the drawings, the invention is shown in application to a lathe including a frame 10, carrying a headstock 11 and tailstock 12, the latter being mounted on elongated guide means 13 extending the substantial length of the frame 10, and oriented in a generally upright plane located on the far side of the line of work-support centers, as viewed from the operator's side and as seen in FIG. 1. A power case 14 includes the headstock 11 and provides suitable spindle drives thereto in addition to various outputs for carriage and slide motions, as will more fully appear. The frame includes elongated guide means 15–16 for slidably guiding a carriage 17. The means for imparting traverse movement to the carriage may be of conventional design and is shown to include an elongated shaft 18 driven from the power case 14 and journaled at the opposite end in a pedestal 19. The shaft 18 passes through the carriage 17 and is engaged therein with gear mechanism keyed to the shaft 18 and forming part of a transmission to a traverse-drive pinion 18', said pinion being in continuous mesh with a fixed elongated traverse rack 20 secured to the frame 10. The gearing within the carriage 17 may include clutching, declutching, and reversing mechanism, whereby continuous motion of the shaft 18 is taken off as necessary to impart forward feeding or return traverse motion to the carriage 17.

The lathe shown is of the type more fully disclosed in said Von Zelewsky patents, and the cross-slide mechanism carried by the carriage 17 is specifically of the kind shown in Von Zelewsky Patent 2,645,149 wherein a differential piston 21 is integral with an end piece 22, through which it is attached by bolts 23 to the carriage 17. The copying or tool-slide 24 encloses the differential piston 21 and slides on guides (as at 25) obliquely to the direction of rotation of the workpiece 4, but, nevertheless generally transverse to the axis of movement of the carriage 17.

In FIG. 1, no workpiece is shown, but in FIG. 2 a short workpiece 26 is supported between the centers of the headstock and tailstock members 11–12. A tool 27 carried by a tool-holder 28 on the cross-slide 24 is shown at the instant of striking a corner or shoulder in the work.

It will be understood that the toolholder 28 is merely illustrative and may be replaced by a holder having a boring tool or rod and one or more inner tools.

A control casing 30, which operates in part as a differential system, is also located within the tool-slide 24 and is connected therewith by means of a threaded member 31 engaged to the casing 30 and journaled for rotation in the cross-slide 24. The upper end of the threaded member 31 extends through the cross-slide 24, and for convenience in making adjustment, a handwheel 32 is secured to the member 31 in an externally exposed position. It will be understood that the handwheel 32 provides convenient adjustment of the casing 30 relative to the cross-slide 24.

The control casing 30 has a passage formed therein which contains a control piston or pilot valve member 33. A spring 29 is located at the inner end of this passage and urges the pilot-valve member 33 against one end of a link 34 forming part of the tracer or template-operated mechanism. The link 34 is pivoted at 35 intermediate its ends, the support for the pivot 35 being part of the control casing 30 so that the pivotal reference for the link 34 remains fixed with regard to the cross slide 24, depending upon the adjustment at 31–32. The opposite end of the link 34 carries a follower or tracer member 36 which is adapted to slide upon the edges of one or more templates, depending upon whether the machine is adapted to support and utilize more than one template. In the form shown in FIGS. 1 and 6, a single template-supporting means or clamp 37 is mounted between spaced pedestals or outboard support members 38–39 and is shown holding a template 40, with the desired contour facing generally downwardly. In FIG. 2, the profile of template 40 is merely suggested by light partial phantom outline.

The carriage 17 is provided with a hydraulic-fluid reservoir 41, as well as a pump 42. The pump 42 communicates by a conduit 43 with a pressure-regulating overflow valve 43', which is urged upwardly by spring means 44.

As indicated generally above, the work template means 40 may be mounted upon the machine frame 10 in any convenient manner; also, for example, as shown in the Von Zelewsky Patent No. 2,645,148, the template 40 may also be conveniently replaced by a work prototype. Therefore, throughout the present description and claims, reference to a template or template means at 40 will be understood to include possible use of multiple (i.e., sequentially traversed) templates or of work prototypes.

*Cross-slide control mechanism*

This mechanism is the same as disclosed in the Von Zelewsky Patent No. 2,645,149. The piston 21 contains a first passage 45 which extends between the pump 42 and an annular space 46 extending around the tail end of piston 21. A second passage 47 formed in the piston 21, extends between the valve 43 and the space 48 above the head of piston 21. The cross slide 24 thus provides the movable cylinder which accommodates the relatively fixed piston 21.

The device for determining the instantaneous extent and direction of feed movement of the cross slide 24 as a function of contour depth (detected along the length of the template 40) is shown in detail in FIG. 2. This mechanism includes a control bracket 50 having an arm 51 and secured to and effectively forming part of the control casing 30. An auxiliary lever 52 is pivoted at 53 on the bracket 50. One end of lever 52 projects into an opening in the tracer link 34, and the tracer link 34 and the lever 52 carry out minute movements throughout the operation of the machine.

The same pivot 53 supports an auxiliary lever 54, to one end of which a roller 55 is pivoted (at 56). The same end of the lever 54 also carries a stop or abutment 57 for engagement with the lever 52. Such engagement is continuously urged by a spring 58 coacting between the other end of the link 54 and an abutment 59 on the bracket 50. The effective force of the spring 58 is preferably about twice that of the spring 29.

It will be appreciated that with the control apparatus thus far described, spring 58 is able to rock lever 54 and (via abutment 57) to also rock lever 52 as far as possible in a clockwise direction about the pivot 53. This means that the pilot valve member 33 will be urged as far as possible in the upward direction, thus opening to the widest extent possible a clearance between the lower pilot-valve edge 60 and the hydraulic chamber 60, said clearance permitting passage of pressure fluid via the passage 62 from the chamber 48. Actually, this opening of the pilot valve member 33 permits free discharge of fluid from the head end of the piston 21 to the reservoir 41 by way of discharge passages 63–64–65 and conduit means 66. Since the pressure fluid on the head end of the piston 21 is free to discharge when pilot valve 33 is opened, the differential pressure across the piston 21 is then such as to produce a strong retracting force on the tool slide 24, withdrawing the same away from the work. The limit of retraction of the slide is determined by a lower limit stop 67 forming part of mechanism to be presently described. Said stop 67 intercepts the outer end of the lever 52 to cause the same to rock counter-clockwise, thus partially closing the pilot valve 33, and the slide 24 comes to rest at a position representing such small opening of the valve 33 as to establish equilibrium integrated pressure conditions on opposite sides of the piston 21.

In order that the cross-slide positioning mechanism may be controlled by the template 40 rather than merely by the retraction of the limit stop 67, means are shown for effectively disabling the retraction mechanism controlled by levers 52 and 54. To this end, an elongated bar 70 is supported between spaced links 71–72 of equal radius, both links 71–72 being pivoted relatively to traverse slide 17. The upper link 71 is pivoted at 73 in a bracket 74 carried by the carriage 17; the bracket 74 includes a spring-detent member 75 engageable with a projection 76 carried by the link 71 so as either to hold the position shown in full lines (wherein the rod 70 is placed close to the cross slide 24) or the position shown in dashed lines labeled 70′ (wherein the rod 70 is retracted slightly away from the slide 24). In the projected position, shown in full lines, the rod 70 engages the roller 55 carried by rocker arm 54, thus relieving abutment 57 from engagement with the link 52, so that link 52 no longer has anything to do with the controlled placement of the pilot-valve member 33. Thus, under these relieved conditions, the pilot-valve spring 29 will tend to close the pilot-valve member 33 to enable a build-up of pressure in the chamber 48 over the head of the piston 21, so that cross slide 24 will advance until the tracer 36 contacts template 40. Of course, upon contact with the template 40, the tracer link 34 is rotated counterclockwise in the sense of FIG. 2, thus opening the pilot-valve member 33 until an equilibrium in integrated pressure conditions is developed on both sides of the piston 21, whereupon cross-slide position is stabilized in accordance with the tracer-sensed template profile.

As also pointed out in said Von Zelewsky Patent 2,645,149, an adjustable infeed limit stop 80 is poised to engage the link 52 for any desired inner limit of feed of the tool slide 24. The upper limit stop 80 controls the successive advance positions of the tool slide 24 for all roughing cuts that are not destined for template control. When in its uppermost position, it also serves as a safety which prevents advance of the tool slide beyond an established safe limit. Of course, when the tool slide 24 is advanced to a point where the link 52 is intercepted by the upper limit stop 80, the link 52 will be rotated clockwise about the pivot 53, thus partially opening the pilot valve 33 to permit freer discharge of pressure fluid from the head end 48 of the piston, and an equilibrium or stop position for the slide 24 will be established when the integrated pressures on opposite sides of the differential piston 21 are equalized for a partially-open position of the pilot-valve member 33.

The adjustable means for setting the lower limit stop 67 is shown to comprise a lead screw 81 driven by meshing bevel gears 82 and an adjustable hand wheel 83, all journaled in frame parts carried by the carriage 17. In like manner, a handwheel 84 is available to drive a second lead screw 85 via bevel pinions 86, the upper limit stop 80 having threaded engagement with the said second lead screw 85. The handwheel 84 provides a manual positioning of the upper limit stop 80. Said Von Zelewsky Patent 2,645,149 also discloses certain abutment means located generally at 87 and coacting with the manual adjustment means 84 for specific purposes set forth in said patent; these purposes are unnecessary in the present case, and therefore there is preferably no abutment coaction at 87 with the manual adjustment means 84.

In accordance with the invention, we provide a completely automatic sequencing mechanism whereby the upper limit stop 80 is incrementally automatically advanced into each of a series of preset positions, each determining a different radius of roughing cut for each of the successive traverses of the tool 27 along the work. A profile such as indicated for the template 40 and producing a step-turning operation, as suggested on the work 26, will require roughing cuts for various lengths of traverse; for example, it will be unnecessary to make as many roughing cuts for the larger radius cuts as for the smaller radius cuts. It is a feature of our invention that the length of traverse for the various automatically sequenced roughing cuts is automatically a function of the depth of roughing cut, it being unnecessary to progress the traverse of carriage 17 any further once all the material that needs to be removed at any particular roughing-cut depth has been removed.

The means whereby the upper limit stop 80 is variously positioned to determine each of the sequenced roughing-cut positions is shown to comprise motor-driven mechanism involving an electric motor 90 carried by bracket means 91 secured to the carriage 17. The motor 90 is shown driving a worm wheel 92 for rotating a shaft 93 having geared engagement at 94 with the positioning lead screw 85 for the upper limit stop 80. Solenoid-operated clutch means 95 and solenoid-operated brake means 96 determine whether motor 90 is to drive the shaft 93 and lead screw 85, or whether their positions are to be held. An eccentric or cam 97 cooperates with the follower of a limit switch or the like 98, whereby revolutions of the shaft 93 may be accurately counted, for purposes to be described.

As a further means of controlling operation of the cross-slide 24 in accordance with the invention, we provide means whereby the rod 70 will be automatically placed either in the position shown in solid lines in FIG. 2 (wherein abutment 57 is relieved from lever 52, so that either stop 80 or the template may govern the position of the cross-slide 24) or, alternatively, in the position shown at 70' (wherein abutment 57 engages lever 52, calling for immediate retraction of the slide 24 to a point determined by placement of the lower limit stop 67). This shift mechanism is shown controlled by a double-acting hydraulic-cylinder mechanism 99 operating the link 72 as a crank, the piston 100 within cylinder 99 being connected by means 101 to link 72. Separate solenoids 102–103 determine the operation of reversing-valve means 104 in controlling relation with the cylinder 99. Valve 104 is a self-centering valve which, as seen in FIG. 2, centers itself automatically upon release from either solenoid so as to open both ends of cylinder 99 to atmosphere to permit manual control of the tool slide 24 by means of hand lever 71'. For the condition depicted in FIG. 2, solenoid 103 has last been actuated to call for the placement of pressure fluid over the head end of piston 100 and for the discharge of pressure fluid from the tail end thereof; similarly, when solenoid 102 is energized to the exclusion of solenoid 103, the valve mechanism 104 is shifted to the left, calling for a reversal of these hydraulic connections, and therefore for a retraction of the piston 100 so as to shift rod 70 into the retract position 70'.

*Carriage traverse-control mechanism*

To complete the description of mechanical parts of the machine in general, it should be pointed out that a reference or starting position for a cutting traverse, which will be assumed to run from right to left, may be determined by adjustably positionable abutment means, such as a collar 105, secured to a rod 106 running the length of the machine and passing through the carriage 17. The collar 105 is aligned with an abutment 107' of a clutch actuating member 107 carried by the carriage 17 and in controlling relation with the traverse-drive mechanism, being effective to declutch the same when the carriage has been returned all the way to the right in readiness for a next recycled operation of the machine.

Coincidentally with declutching of the traverse drive at 105–107, upon return of the carriage 17 to the right, abutment 108 on carriage 17 actuates a frame-based limit switch 109 utilized for automatic recycling for successive traverses at progressively increasing depths of cut. It will be understood that switch 109 may be carried by carriage 17 and may coact with the frame-based abutment 105 (concurrently with member 107), but that switch 109 is shown to be frame-based in FIG. 1 merely for purposes of simplified illustration. Limit switch 109 has normally open contacts 109', FIG. 3, in series with cross slide advance solenoid 103, and normally closed contacts 109' in series with the stepping coil 134 (FIG. 3A) of a multiple deck stepping switch 130. When the machine cycle requires that the carriage 17 always return to full retracted position for each cut, as for example the set-up shown in FIG. 5, contacts 109' are held closed and contacts 109'' are held open by engagement of the abutment 108 with the switch, as seen in FIG. 1, at the end of the machine cycle.

The left-hand ultimate limit of forward carriage traverse or feed may be determined by a second abutment means 110 also carried by the carriage 17 and coacting with a second limit switch 111 mounted on the frame. Limit switch 111 has normally closed contacts 111' in series with the spindle clutch and brake relay R–2 (FIG. 3) and normally open contacts 111'' in series with the cross slide retract solenoid 102. Ordinarily, the limit switch 111 will not be utilized to terminate a traverse movement because, as indicated generally above, it is a feature of our invention that traverse for a roughing cut is only progressed to the extent necessary to remove material on such cut, and this extent may be substantially less than the total length of the workpiece 46. It is only in making final template-controlled or finish cuts on the work that limit switch 111 is operated, and of course, the setting for limit switch 111 should be such as to permit a complete finish-cutting traverse of the work before developing a trip signal for terminating the last or finish-cutting traverse.

As shown in FIG. 9, the carriage traverse drive mechanism comprises a clutch and piston assembly 220–220' adapted for alternate engagement with the clutch elements of forward and return traverse drive gears 221–222 respectively under the control of member 107 which is shown as being in the form of a spool valve for controlling the flow of fluid to either side of the piston 220'. The clutch assembly is mounted for relative rotation on an input shaft 223 which is driven by the rapid traverse and feed drive train of the machine. Gear 221 meshes with a forward drive gear 224 and gear 222 meshes with an idler 225 for rotating return drive gear 226 opposite to gear 224. Gears 224–226 are keyed to an output shaft 227 which also has a worm 228 meshing with a worm wheel 229 fixed to the stub shaft that supports the carriage drive pinion 18' (see also FIG. 7). The operation of the carriage drive is briefly as follows; when the tool or copying slide 24 is retracted upon energization of RETRACT solenoid 102, an adjustable tool slide based trip dog 113 engages and rocks a pawl 113' in a counterclockwise direction, thus displacing spool valve 107 to the right, thereby admitting fluid to the right end of clutch and piston assembly 220–220' to couple return traverse gear 222. Spool valve 107 is responsive to pawl actuation upon tool slide retraction only; on tool slide advance, pawl 113' merely rides trip dog 113 clockwise. It is understood that the carriage may be shifted from slow forward feed directly through neutral to rapid return traverse; however, in multiple-cut set-ups, for example FIGS. 2, 5 and 6, the carriage drive must be shifted to neutral in going from rapid return to rapid approach, it being understood that direct reversal at high speed could result in severe overload on the drive train. As the carriage approaches the end of its return traverse, abutment 107' of spool valve 107 engages stop collar 105 thus displacing valve 107 leftward to neutral position as seen in FIG. 9 to stop the carriage at cycle start position just as actuator 108 engages and holds limit switch 109 to close its normally open contacts 109' (FIG. 3) to energize ADVANCE solenoid 103. The dwell of the carriage is very short because energization of solenoid 103, through is valve 104 and cylinder 100, immediately starts the tool slide upward to advance the tool for the next cut and a lower trip dog 114, also adjustably secured to the bracket 51 of the cross slide 24 engages the left end of the plunger 212 thus rocking a lever 211, which is pivotally mounted on the carriage so that its upper end engages the abutment 107' of spool valve 107, in a counterclockwise direction to displace the spool valve fully leftward to admit fluid to the left end of clutch and piston assembly 220–220', thereby engaging clutch gear 221 for forward traverse. Upon termination of the finishing cut, the carriage returns to cycle start position and remains at rest because the circuit to tool slide ADVANCE solenoid 103 is opened at R2–2 (FIG. 3) upon deenergization of SPINDLE CONTROL Relay R–2 as will be described more in detail hereinafter. A control lever 230 (FIG. 9) provides for manual engagement of the forward and return traverse clutches so that the operator may traverse the carriage to and fro at will when the rotary selector switch 160 (FIG. 3) is set at MANUAL.

It has been indicated generally above that it is a feature of our invention that means shall be operative to sense when an adequate traverse has been made for any particular roughing-cut radius, said means being immediately effective to terminate forward traverse and to return the carriage 17 to starting position for a new traverse, said means being further effective to automatically index the tool 27 for a roughing-cut radius further inwardly for the next roughing cut or for following the template, depending upon the number of roughing cuts necessary to get the tool into the smallest radius position called for by the template.

The particular mechanism which we employ for this purpose responds to a first coaction between the template and the template follower during any particular traverse at a given radius. For example, for a first roughing cut, it may be necessary to traverse at the radius of tool 27 shown in FIG. 2, but of course, it would not be necessary (at that particular radius of cut) to traverse the tool 27 any further than the position shown in FIG. 2. By the time the tool 27 reaches the position shown in FIG. 2, the tracer 36 will have reached the left step in the template 40 calling for the larger diameter part 112 of the workpiece 26, so that for the roughing-cut traverse involving placement of tool 27 at the radius shown, the tracer 36 will first coact with the template 40 when the shoulder 115 is reached, thereby determining the shoulder 116 on the work.

In accordance with the invention, we provide an electrical circuit which is automatically completed when the tracer 36 first contacts the template 40 for the preset radius on a given traverse. This is accomplished by insulating the template 40 from the template clamp or support 37 with dielectric material 117 as shown in FIG. 1A, and by electrically connecting the template 40 in a suitable control circuit, designated generally 118 and to be described in greater detail. It will, of course, be understood that the machine frame 10 (and with it all other parts except for the template 40), will be at electrical ground potential, and this of course includes the tracer or template follower means 36. Thus, upon contact of the tracer 36 with the template 40, the control circuit 118 is activated, as will be more clearly pointed out.

*Roughing-cut control mechanism (normal cycle)*

The particular mechanism to be described for controlling the squencing of successive roughing-cut depths may be electrical and is shown in detail in FIGS. 3 and 3A. However, this will be more readily understood, by first referring to FIG. 4, which displays an important part of the control panel wherein the operator preselects the desired roughing-cut program. The control panel of FIG. 4 is particularly adapted to call for a maximum of six roughing cuts, prior, of course, to the one or more ultimate template-controlled cuts used for finishing the workpiece.

Figure 4:
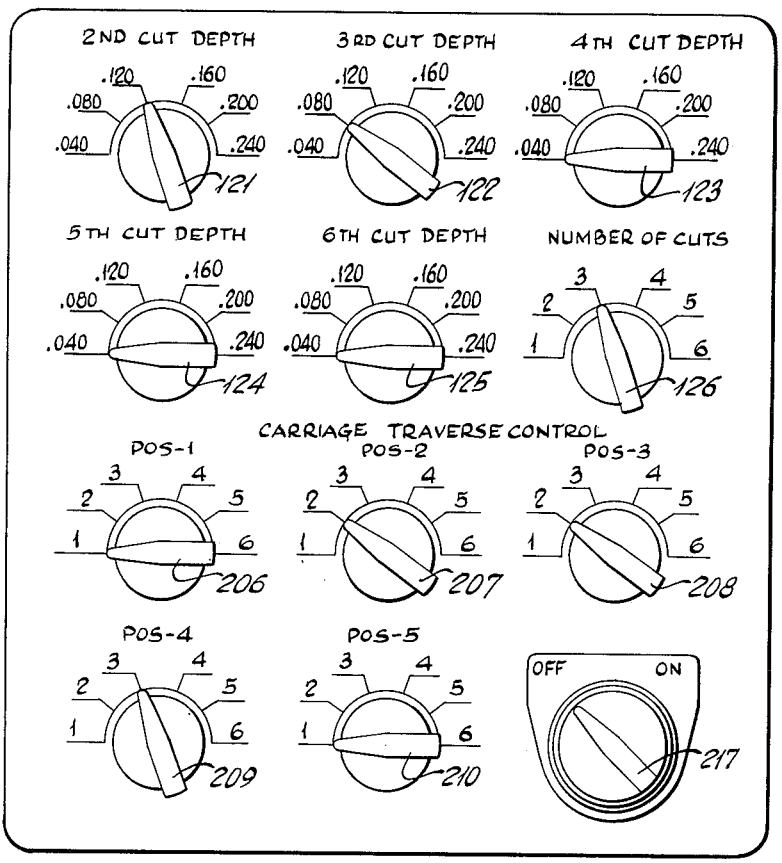
FIG. 4 is a front view of the manual preselector panel operative to preset certain of the components of FIG. 3, to determine the depth (as well as the number) of successive cuts to be made with our machine; and also to preselect the cycle start position of the machine cycle.

The depth of first roughing cut is not selected by the panel of FIG. 4, but is determined merely by an initial manual setting established at 84 for the upper limit stop 80. In other words, when the first workpiece of a run of similar workpieces is placed between centers in the machine, the operator sets the tool to its desired depth for the first cut on the workpiece by means of the handwheel or knob 84.

The control panel of FIG. 4 thus provides only for programming second, third, fourth, fifth and sixth roughing cut depths and provides for each cut a different depth selector 121–122–123–124–125. Each of these depth selectors is shown to have six possible positions, determining respectively, for example, different incremental advances of the cutting tool relative to the work, the feed increments being shown in steps of 0.040 inch. For example, if it is desired that the second roughing cut shall be to a depth of 0.120 inch inwardly of the first roughing cut, then the second cut depth selector 121 should be set in the position shown in FIG. 4. If it is desired that the third roughing cut shall be 0.080 inch deeper than the second roughing cut, the third depth-cut selector 122 should be set as shown in FIG. 4. For purposes of discussion, it is assumed that no fourth, fifth and sixth cuts will be necessary, and therefore it makes no difference where the selectors 123–124–125 are set; they are, however, shown in the minimum-cut positions, each calling for a depth of 0.040 inch beyond the previous cut depth.

In addition to the depth-of-cut selectors, the panel of FIG. 4 also includes a selector switch 126 for determining the number of roughing cuts to be made during a full work cycle and, for the conditions shown, there are to be three roughing cuts. This will be understood to mean that the first roughing cut will be to a depth selected at knob 84 by the operator and presumably of the order of 0.120 inch, and that the second and third cuts will be to incremental depths of 0.120 and 0.080 inch, respectively, as selected by dials 121 and 122. The electrical circuit for sequencing these cuts responds to the number-of-cuts selector 126 to effectively ignore the fourth, fifth and sixth depth selectors 123–124–125 for the assumed case of three selected roughing cuts.

The positions shown in FIG. 4 for the roughing-cut program are reflected exactly in the circuit diagram of FIGS. 3 and 3A, and corresponding numbers have been given to the selectors thus identified. It has been noted that the possible incremental feed advances for selecting roughing cuts progress in steps of 0.040 inch; this is for the assumed case in which one revolution of the shaft 93 (see FIG. 2) advances the upper limit stop 80 by that amount.

The circuits of FIGS. 3 and 3A will be understood to provide a composite control circuit. The principal parts of the circuits will first be identified before a description of the full cycle of operation, the circuit of FIGS. 3 and 3A being excited by a first line connected transformer 129 and a second transformer 127 whose output is rectified to direct current by the full wave rectifier 128.

Briefly, the control mechanism shown in FIG. 3 relies on three functionally different but structurally similar multi-level stepping switches 130–140–150 and their respective integral stepping and RESET mechanisms 130', 140" and 150' to perform three discrete functions. A first stepping switch 130 performs the function of cut selection, and its successive contacts at the first level coact with the wiper arms of each of the Depth-of-Cut selector switches 121–122–123–124–125. A second stepping switch 140 performs the function of increment control for the particular cut that is to be made next; this increment-control switch is caused to reset prior to each successive roughing cut and, depending upon the particular roughing cut to be made, the increment-control stepping switch 140 will be stepped (one step for each revolution of shaft 93), from its fully reset position until it determines that it has counted off to the selected depth, for the particular roughing cut preselected on a depth of cut selector. The third stepping switch performs a depth-totalizing function and is identified by the reference numeral 150. This third stepping switch adds the increments of all cuts as they are made; in other words, it performs similarly to the increment-control stepping switch 140 except that all increments are totalized at stepping switch 150, the latter being reset, as will be explained, only after all automatic functions have been completed. The purpose of the depth totalizer is to keep track of the progressively advanced position of the tool stop 80 so that this stop can be retracted automatically by the same amount to recondition the machine for operation on the next piece of work.

The first stepping switch, labeled "Cut Selector" and identified by the reference numeral 130, may be considered as a counter, indexing successive reciprocations of the carriage 17 during a machine cycle. It includes four level of contacts served by four contact arms 131–132–133–200 ganged to operate in unison and to advance one step position for each pulsed excitation of the Cut-Selector-STEPPING or ADD coil 134. The Cut Selector 130 also includes a RESET coil 135 which, when excited, cooperates with interrupter means 136 to rapidly reset or "ZIP" the Cut Selector 130 back to its starting position, shown as the position where the selector arms 131–132–133–200 contact the leftmost contact terminal in each of the four levels of the selector switch 130.

In like manner, the second selector switch, labeled "Increment Control" and identified by the number 140, comprises two levels of contacts served by two ganged contact arms 141–142. The arms 141–142 are advanced one step for each pulsed excitation of the Increment-STEPPING or ADD coil 143, and a given advanced or stepped position of the arms 141–142 may be reset or "zipped" back to the leftmost or starting position immediately after the switch has counted the increment required on a particular cut selector for a succeeding cut by exciting an Increment-RESET coil 144 coacting with interrupter means 145, as will be understood.

Finally, the third selector switch, identified as the "Depth Totalizer" 150, is shown to comprise two levels of contacts served by two ganged contact arms 151–153. The arms 151–153 are advanced by one step for each pulsed excitation of a Depth-Totalizer STEPPING or ADD coil 154, it being noted that the said STEPPING coil 154 is in parallel with the Increment-STEPPING or ADD coil 143, so that contact arms 141–142 and contact arms 151–153 of stepping switches 140 and 150 respectively are stepped in unison; however, at the end of the increment count for each roughing cut the contact arms 151–153 of DEPTH TOTALIZER stepping switch hold, while the contact arms 141–142 of INCREMENT CONTROL stepping switch reset or "zip" back to zero, thereby tallying or totalizing the increments, (or revolutions of counting shaft 93), as they are successively counted off each depth of cut selector to reposition the upper limit 80 for each cut. Upon completion of the template controlled finishing cut, SPINDLE CONTROL relay R-2 stops the spindle and, through electrical instrumentalities to be described, also reverses the polarity of and starts the feed stop motor 90 in reverse to run the upper limit stop 80 down lead screw 85 precisely the same distance it was run up as represented by the totalized increments or counting-shaft revolutions. The same number of shaft revolutions in reverse are counted back or subtracted by controlling energization of RESET coil 155 and its interrupter 156 through pulsing relay R-7 which paces the contact arms 151–153 of DEPTH TOTALIZER stepping switch 150 back to zero. Thus the upper limit stop 80 is always returned to precisely the same cycle start position.

*Selective short carriage traverse cycle means*

When the lathe is set up for this type of multi-cut operation (such as shown in FIG. 6), the control of the carriage traverse for roughing cuts is different than that for normal set-ups as shown in FIGS. 2 and 5 because the cycle is started and the carriage traverse is reversed, at preselected points within the total traverse required for a typical template controlled finishing cut. As seen in FIG. 6, the cycle start is positioned so that a first roughing cut (set by the operator to a depth of .120") is taken on the major diameter at the spindle end of the workpiece; identical second and third cuts each to a depth of .120" for a smaller intermediate diameter; and a fourth roughing cut of .080" for a minor diameter extending from the right end to an intermediate shoulder of the workpiece. Upon completion of the last (fourth) roughing cut, the return traverse of the carriage 17 is stopped, (as in normal cycle), by abutment 107' engaging the stop collar 105, and reversed to forward traverse for the template controlled finishing cut of .030", (shown cross hatched), by trip dog 114 and lever 211 after which the carriage executes a short return traverse back to cycle start position, as seen in FIG. 6. The means for reversing the carriage drive from forward to return after each short carriage traverse at the preselected intermediate points is a fluid actuated single acting cylinder 203 which is mounted on the carriage substantially coaxial with the control member 107 as seen in FIG. 2. The piston 204' is spring biased to normal position by a spring within the cylinder, and it has a projecting tail rod which carries an actuator 204 that coacts with a limit switch 205 when the piston, under fluid pressure, approaches the end of its leftward travel. The stroke of the piston is only sufficient to displace the control member 107 to neutral position to stop the carriage in return traverse. Fluid pressure is admitted to cylinder 203 upon energization of the CARRIAGE STOP solenoid 201 of a single acting solenoid valve 202 which may be carriage based. The valve is spring biased to open the pressure side of cylinder 203 to atmosphere as seen in FIG. 2 when solenoid 201 is de-energized. Solenoid 201 is sequentially connected (with other electric control instrumentalities to be described), in series with the contact arm 200 (FIG. 3A) coacting with the contacts 200' at the carriage control level of the CUT SELECTOR stepping switch 130. Each of the contacts 200' is connected in series with the contact arm of a different one of manual CARRIAGE TRAVERSE control selector switches 206, 207, 208, 209, 210 which are mounted on the same control station panel as the depth of cut selector switches 121 to 125 as seen in FIG. 4. The like contacts of each selector 206 to 210 are in turn connected in series parallel with their individual normally open limit switches LS-1, LS-2, LS-3, LS-4, LS-5. As shown in FIGS. 7 and 8, these limit switches are adjustably mounted on a dovetail shaped switch rail 214 fixed to the rear of the frame 10, and are actuated by an actuator 215 projecting upward from a rearwardly projecting arm 216 fixed to the carriage 17. Limit switches LS-1 to LS-5 are directly related to carriage traverse control selectors 206 to 210 in the same progression. These limit switches are one way actuation type and are responsive to carriage return traverse only.

When a roughing cut is completed and the carriage is on return traverse, the actuator 215 will actuate those limit switches that may lie within the short return traverse but only the one that is in circuit with the contact arm of one of the position selectors and contact arm 200 at the carriage control level of stepping switch 130 will energize CARRIAGE STOP solenoid 201 of valve 202 to admit fluid pressure to cylinder 203, thus displacing the control member 107 leftward into neutral position to stop the carriage 17. As the piston approaches the end of its leftward stroke, actuator 204 on the end of the tail rod engages a carriage based limit switch 205 and closes its normally open contacts 205' which energizes the tool slide ADVANCE solenoid 103 to advance the tool slide 24 for the next cut. When the carriage is shifted to forward traverse by trip dog 114, actuator 215 disengages its abutted limit switch LS-1, 2, 3 or 4, thus dropping CARRIAGE STOP solenoid 201 and opening cylinder 203 to atmosphere whereupon the tail rod actuator 204 also releases limit switch 205.

When the template controlled finishing cut is completed, the carriage borne actuator 110 engages limit switch 111 to open its contacts 111' to drop spindle control relay R-2 and close switch contacts 111" which energizes RETRACT solenoid 102 thus retracting tool slide 24 which in turn shifts carriage 17 into return traverse. At the same time the CUT SELECTOR selector switch 130 has reset or "zipped" back to zero upon closing of the normally closed relay contacts R-2-6 so that its contact arm 200 is in the position as seen in FIG. 3A. The carriage being in return traverse, the actuator 215 actuates LS-1 which, through Position-1 selector 206, energizes the CARRIAGE STOP solenoid 201, thus stopping the carriage 17 with the actuator 215 holding limit switch LS-1 closed as seen in FIG. 8, it being understood that the cycle start position for all short carriage traverse set-ups is determined by the selected position of the contact arm 206 of position-1 selector switch 206. Since solenoid 201 is held, actuator 204 on the piston tail rod also holds limit switch 205 so that its normally open contacts 205' are held closed while its normally closed contacts 205″, in the circuit of stepping coil 134 for stepping switch 130, are held open. Although the contacts 205′ are being held closed, the circuit to ADVANCE solenoid 103 through SPINDLE CONTROL relay contacts R–2–2 is open and the normally closed contacts R–2–4 are holding RE-TRACT solenoid 102 so that carriage 17 remains at rest until the operator presses the CYCLE START switch 161 for a new machine cycle.

An ON-OFF rotary selector switch 217 is connected in series with CARRIAGE STOP solenoid 201. When this switch is set at ON the circuit through limit switches LS–1 to LS–5 and solenoid 201 is activated to condition the lathe for selective short traverse cycle, for example FIG. 6. When it is set at OFF as in FIG. 3A this circuit is deactivated and the lathe functions in normal multi-cut cycle, for example FIGS. 2 and 5.

In the control circuits of FIGS. 3 and 3A, a number of relays are identified, and it is useful to list and briefly describe these relays before setting forth their function in the fully automatic cycle. The relays all carry the designation R followed by a number, and the contacts for these relays are identified by the same designations followed again by a hyphen and a number to designate a particular contact; for example, the third set of contacts for relay R–5 would be designated R–5–3. The wiring diagram is key coded so that the various relays and their related contacts can be readily identified as follows: the numbers to the left of the left vertical main control wire refer to the cross or horizontal wires which have relay contacts, and the rows of numbers adjacent the legends (to the right of the right vertical main control wire) which describe the relays, refer to the cross wires where the contacts for that relay are located.

*Automatic relay R–1.*—This relay is activated when the Auto-Manual selector switch 160 (see FIG. 3A) has been actuated into the position calling for "Automatic" operation, and when the Motor Start button 158 has been pressed; selection of the "Manual" position of switch 160 opens the circuit to relay R–1, to drop out the same. Relay R–1 has first normally open contacts R–1–1 in series with the cross-slide advance solenoid 103, second normally open contacts R–1–2 in series with the template-operated carriage-recycling circuit to relay R–3, third normally open contacts R–1–3 in series with the feed-stop clutch and brake solenoids 95–96, and fourth normally open contacts R–1–4 in series with the cross-slide-retract solenoid 102. This relay also has normally open contacts R–1–6 in series with pulsing switch 98; and normally closed contacts R–1–7 and R–1–5 in the circuit to the stepping levels of the INCREMENT CONTROL and DEPTH TOTALIZER stepping switches 140 and 150, respectively; when the Rotary Selector Switch 160 is set at MANUAL contacts R–1–6 deactivate Pulsing Relay R–7 and contacts R–1–7 and R–1–5 rapidly reset or "zip" stepping switches 140 and 150 back to zero position as shown in FIGS. 3 and 3A. Normally open contacts R–1–8 deactivate the feed motor reversing relay R–8 when switch 160 is set at MANUAL.

*Spindle-control relay R–2.*—This relay governs spindle-clutching to the main motor (via normally open contacts R–2–1). Its normally open contacts R–2–2 serve a hold-in function, and its normally closed contacts R–2–3 excite the spindle-brake solenoid whenever relay R–2 drops out. Its normally closed contacts R–2–4 assure that the cross-slide 24 may be quickly retracted at any time during automatic operation, merely by pressing the Cycle-Stop button 159. Normally closed contacts R–2–5 rapidly reset or "zip" the CUT SELECTOR back to zero position and also energize relay R–8 to reverse FEED STOP MOTOR 90 so as to screw the upper limit stop 80 back to first cut position as DEPTH TOTALIZER 150 is stepped or counted back to zero when relay R–2 is deenergized by carriage borne actuator 110 opening contacts 111′ of limit switch 111 at the end of the finish cut. Normally open contacts R–2–6 restore the circuit to stepping coil 134 of CUT SELECTOR 130 upon actuation of CYCLE START switch 161 which actuation, through normally closed contacts R–2–7 also deenergizes relay R–10 to open the circuit to RESET coil 155 and reestablish the circuit to the stepping coil 154 of DEPTH TOTALIZER 150 for the next machine cycle. Normally closed R–2–8 contacts alert the circuit to carriage stop solenoid 201 of a control valve 202 for stopping the carriage at the end of the machine cycle when the lathe is set up for preselected short traverse.

*Recycle relay R–3.*—This relay functions through an electronic relay 163 and in response to completion of an electric circuit between the tracer 36 and the electrically insulated template 40. Operation of relay R–3 signals the end of a roughing-cut traverse and initiates recycling of the carriage traverse mechanism for the next roughing cut. To this end, and also for the final finishing cut in the work cycle, first normally open contacts R–3–1 excite the cross-slide-retract solenoid 102, second normally open contacts R–3–2 excite the Feed-Stop Drive relay R–5 to initiate a repositioning upward (increment add) of the upper limit stop 80 (FIG. 2), third normally open contacts R–3–3 excite the Cut-Selector-Stepping or ADD coil 134 to step selector 130 to the next rough cut depth selection, and fourth normally open contacts R–3–4 certify that the first manually set rough-cut traverse has been completed so that the Stepper-Activating relay R–11 may be energized.

*Increment-complete relay R–4.*—This relay is activated for each recycling of the program means, that is, for each traverse of the work for roughing cuts, and in each such case it certifies that the required number of increments for a desired depth of cut has been counted in accordance with the setting of a particular one of the selectors of FIG. 4. Upon energization, its normally closed contacts R–4–1 drop out the Feed-Stop-Drive relay R–5 to stop Feed Stop Motor 90 and hold a newly established position for the infeed limit stop 80.

*Feed-stop-drive relay R–5.*—This relay is activated once for each depth-of-cut adjustment, that is, once for each roughing-cut traverse cycle. The relay R–5 has its own hold-in contacts R–5–6, and its normally open contacts R–5–1 control actuation of the feed stop clutch 95, while its normally closed contacts R–5–2 govern activation of the feed-stop brake 96, upon drop-out of relay R–5. Its normally open contacts R–5–3 govern excitation of the feed-stop motor 90; it will be noted that motor 90 is preferably of the direct-current type, so that forward and reverse operation thereof are readily available. Normally closed R–5–4 contacts open the circuit through stepping switches 130 and 140 and depth of cut selectors to increment complete relay R–4. Normally closed R–5–5 contacts rapidly reset or "zip" the increment control stepping switch 140 back to zero as relay R–5 is deenergized at the conclusion of the increment count for each roughing cut.

*Template-disconnect relay R–6.*—This relay functions upon completion of the last roughing cut called for by the Number-of-Cuts selector 126 of FIG. 4, and its principal function is to isolate (via normally closed contacts R–6–1) the circuit including template 40, thereby effectively disabling the recycle relay R–3 and permitting the last or finish-cut traverse to be made by continuous contact of tracer 36 with the template 40. This relay also has normally closed contacts R–6–3 in parallel with normally closed contacts R–5–4. These contacts isolate relay R–4 from control through the cut selector level of stepping switch 130 and the cut selector switches, so that the contact arm 141 of stepping switch 140 will sweep all the way to terminals 178 before energizing relay R–4, thus raising the upper limit stop 80 a substantial number of increments to clear lever 52 so that tracer 36 will engage the template to trace the finish cut. Normally open contacts R–6–4 are the holding contacts. The normally open contacts R–6–1 alert the circuit to TOTALIZER SUBTRACT relay R–10 which, upon deenergization of spindle clutch relay R–2, is energized to start the FEED STOP MOTOR 90 (which is now connected in reverse) to step or count the DEPTH TOTALIZER back to zero.

*Pulsing relay R–7.*—This relay functions once for each intermittent closure of the switch means 98, meaning once for each revolution of the shaft 93, calling in the assumed case for an incremental advance of the lower limit stop 80 by 0.040 inch. This relay has normally open contacts R–7–1, providing pulsed excitation of the Increment-Stepping or ADD coil 143 and of the Depth-Totalizer-ADD coil 154, for the case of progressive tool advance into the work. When the feed motor 90 is reversed to screw the upper limit stop 80 back to cycle start position, the relay contacts R–7–1 also provide pulsed excitation for RESET coil 155 of the depth totalizer 150 to count back or subtract the revolutions (or increments) of shaft 93 that were totalized during the machine cycle. Further normally open contacts R–7–2 of this relay are in parallel with the control circuit of the Feed-Stop-Drive relay R–5 and assure that relay R–5 will not stop shaft 93 at a position in which the counter-switch 98 is held closed. This assures that no error will be made in the totalizing of counts "in" or "out" for the tool-positioning mechanism.

*Motor-reversing relay R–8.*—This relay has a pair of normally closed contacts R–8–1 and R–8–2, and a pair of normally open contacts R–8–3 and R–8–4, all of which are connected in the excitation circuit for the speed-stop motor 90 and are arranged to reverse the polarity of excitation of the motor 90 upon energization of relay R–8 through normally closed contacts R–2–5 when the spindle is stopped, thereby enabling reversed drive of the shaft 93 upon subsequent excitation of the clutch 95 through normally open contacts R–5–1 of Relay R–5.

*Feed motor stop relay R–9.*—This relay responds to completion of a circuit when the Depth Totalizer 150 has, upon deenergization of Relay R–2 to stop the spindle, finally been reset to zero position, meaning that the automatic sequencing of all traversed roughing and finishing cuts has been completed. Relay R–9 has one set of normally closed contacts R–9–1 which function to positively shut down the feed-stop drive by deactivating the Feed-Stop-Drive relay R–5 when the inner limit stop 80 has been returned (by "subtract" counting at 155′–156) to cycle starting position. Upon energization of Relay R–9 contacts R–9–1 also drop TEMPLATE DISCONNECT Relay R–6 to reestablish the template responsive circuit through normally closed contacts R–6–1.

*Totalizer subtract relay R–10.*—This relay functions upon closure of normally closed contacts R–2–7, when relay R–2 is deenergized to stop the spindle at the end of the last finish cut, to reverse the operation of the DEPTH TOTALIZER 150, it being understood that the normally open contacts R–6–1 were closed upon energization of TEMPLATE DISCONNECT Relay R–6. When relay R–10 is energized its normally open contacts R–10–1 close to energize relay R–5 and start the FEED STOP MOTOR 90 (now in circuit for reverse rotation through contacts R–2–5); normally closed contacts R–10–2 open to deactivate STEPPING coil 154; and normally open contacts R–10–3 close to energize RESET coil 155 to step (through pulsing contacts R–7–1) of DEPTH TOTALIZER 150 back to Zero.

*Increment control and depth totalizer relay R–11.*—This relay normally open hold-in contacts R–11–1 and normally open contacts R–11–2 in series with the control circuit for the Feed-Stop Drive relay R–5. Relay R–11 has further normally open contacts R–11–3 which serve to hold open the pulse circuit to the Increment Stepping or ADD coil 143, to the Depth-Totalizer Stepping or ADD coil 154, and to the Depth-Totalizer-RESET or SUBTRACT coil 155 during the first roughing cut. This assures that no counting operation can take place during the first roughing cut, which, it will be recalled, is determined by a manual setting by the operator, as established by manipulation of knob 84. For a full cycle of operation on a workpiece 26, the relay R–11 is first actuated after completion of the manually set traverse to alert the circuit to stepping coils 143, 154; this event is noted when the template circuit 40–36 first is effective to pick up the recycling relay R–3, because this will close normally open contacts R–3–4 thereof for the first time, thus picking up relay R–11, whereafter the hold-in contacts R–11–1 maintain relay R–11 energized.

*Main-motor start relay R–12.*—This relay coil is the solenoid for the main-motor contactor, the contacts 181 of which are closed upon pressing the Motor-Start button 158. Its hold-in contacts R–12–1 keep relay R–12 continuously excited until the Motor-Stop button 157 is pressed.

*Cycle of operation (normal multi-cut cycle)*

For purposes of describing such cycle of operation, it will be assumed that the selector knobs on the panel of FIG. 4 have been placed in the positions already described and shown. Thus, for example, the first cut to be produced (on the first workpiece of a given production run) will be a manually set cut, depending upon the operator's placement of the hand knob 84, it being understood that sufficiently accurate setting of the hand knob 84 is readily achieved by observing its setting against a scale (not shown), in the conventional manner. The second rough cut will immediately follow in automatic sequence and to a depth represented by the 0.120 setting of the selector 121. The third cut will follow with a further depth of cut representing 0.080 inch further than the second cut. Finally, a finish cut will be made directly off the template 40, and the machine will recondition itself in readiness to start a similar sequence of operations upon the next workpiece 26 to be inserted, the machine being conditioned to make the first roughing cut on the next workpiece at exactly the same radius as originally manually set, so that no further manual adjustments are needed after making the first piece.

First of all, the main motor 180 must be started, by first closing line breaker 170, and by then pressing the motor-start button 158 shown in FIG. 3. Spindle rotation is accomplished by engagement of the spindle clutch 171, and this will occur upon excitation of relays R–1 and R–2, meaning that "automatic" operation has been selected at 160 and that the Cycle-Start button 161 has been pressed. This immediately excites the cross-slide-advance solenoid 103, advancing the bar 70 against the roller 55, so that the lever 52 will be free to be positioned by engagement with the inner limit stop 80 when the slide 24 reaches the position set at knob 84 for the first roughing cut. As the slide 24 advances in this manner, it effects coaction between the carriage traverse actuating means 114 and 107, and forward traverse commences for the first roughing-cut depth. The template and tracer 40–36 will of course not be engaged during this part of the operation, and sole tool positioning control is determined by the inner limit stop 80, as initially manually set. Eventually, however, the tracer 36 will hit some part of the template 40, as, for example, the step 115 (see FIG. 2) thereof, at which time the electronic relay 163 will be actuated to pickup recycling relay R–3 for the first time. This has the effect of immediately actuating relay R–11, so that the automatic-sequencing and cut-advancing mechanism may be set into operation. Relay R–11 holds itself in until the Full-Reset relay R–9 becomes operative, meaning that the full multi-cut cycle has terminated.

Upon operation of the tracer-operated trip circuit, the first roughing-cut traverse is completed, and closure of the contacts R–3–3 completes the circuit for exciting the Cut-Selector-Stepping or ADD coil 134. This circuit will be held ready by means of contacts R–2–6 as long as the Spindle-Clutching relay R–2 remains energized. This excitation of the Cut-Selector-Stepping or ADD coil 134 has the effect of displacing all arms 131–132–133–200 of the cut selector from their leftmost or dead positions; thus, contact arm 131 will now be on the first contact 131' of its upper level, meaning that the circuit to the second cut depth selector 121 has been alerted.

At the same time, closure of the normally open contacts R–3–2 of the recycling relay picks of the Feed-Stop-Drive relay R–5, thereby clutching the shaft 93 to the motor 90 in the inward-feeding direction. Rotation of this shaft 93 develops one pulse at 98 with each revolution, and this is accompanied by one pulsed actuation of the relay R–7 for each revolution of the shaft 93. Each pulse of R–7 is effective to similarly actuate both coils 143 and 154 for the Increment-Stepping or ADD and for the Depth-Totalizer-Stepping or ADD mechanisms. This means that the arms 151–153 progress one step for each such pulsed actuation, and that the increment-control arms 141–142 are similarly advanced. This amounts to a scanning operation insofar as the increment-control stepping switch 140 is concerned, because upon arrival of the arm 141 at a contact corresponding to the particular circuit selected by the now alerted second cut depth selector 121 (namely, for the form shown upon the arrival of arm 141 at the contact 175), the circuit to the Increment-Complete relay R–4 is made, thereby opening the normally closed contact R–4–1 thereof so as to drop out the Feed-Stop-Drive relay R–5 and through normally closed contacts R–5–2 thereby apply the brake 96 to hold the adjusted position of the inner feed stop 80 in readiness for the second roughing cut.

Of course, when the recycling relay R–3 operated at the end of the first traverse, its contacts R–3–1 closed, so as to excite the cross-slide retract solenoid 102, thereby not only assuring retraction of the tool 27 from the work to the position limited at stop 67 (see FIG. 2), but also actuating the quick-return traverse mechanism 113—113' for recycling back to the position for commencing the second cut traverse. Return to this position is certified by the abutment 107' engaging the stop collar 105 to shift the carriage drive into neutral thus stopping the carriage 17; at the same time actuator 108 engages limit switch 109 to energize advance solenoid 103, thus advancing the tool slide 24 which, through trip dog 114 and lever 211, shifts the carriage into rapid forward traverse. As the tool approaches the workpiece, the carriage is automatically shifted from rapid approach to feed speed for the second roughing cut by suitable old and well known means which form no part of this invention. Meanwhile, during the rapid return of the slide to the starting position for the second cut, the increment control 140 automatically reset or "zipped" itself to zero due to closure of the normally closed relay contacts R–5–5 when the Feed-Stop-Drive relay R–5 dropped out on completion of the re-established reference position for the inner feed stop 80.

The second traverse cut then proceeds automatically in the manner described for the first roughing traverse, until the template and tracer 40–36 again contact each other, thereby immediately picking up the recycling relay R–3 and advancing the cut selector to the next or third cut depth selection circuit, being identified on the top level of the selector 130 by contact 131''. The scanning and resetting functions then repeat to determine the third cut depth, as selected by the selector 122. The cycle repeats itself as often as necessary and as determined by the Number-of-Cuts selection at 126 (see FIGS. 3 and 4).

All roughing cuts will have been completed by the time the last roughing traverse selected at 126 has been completed. The particular instant of time at which the machine knows this has been accomplished occurs at the end of the last roughing cut when tracer 36 strikes the template to again activate the recycling relay R–3, causing a step of advance of the CUT SELECTOR switch 130. This time, the arm 132 on the third level of the Cut-Selector stepping switch 130 reaches the contact 179 to complete a circuit through the Number-of-Cuts selector 126, and the relay R–6 will be energized to thereafter disconnect the template from any control operation through normally closed contacts R–6–1. This permits the machine to recycle, as previously described, back to cycle start position, but when the cross-slide 24 is again fed in, it is no longer limited by the inner feed stop 80, but runs directly off the tracer, in accordance with the sensed profile of the template.

At the same time that recycling relay R–3 stepped the cut selector switch 130 to position for picking up template disconnect relay R–6, it closed contacts R–3–2 to pick up R–5. With both R–6 and R–5 energized, the contacts R–5–4 and R–6–3 in the connection from the supply line to the arm 131 of the upper level of switch 130 are open and the normal circuit through increment complete relay R–4 cannot be made when increment control switch 140 is subsequently stepped by an R–7–1 pulse. To assure that the inner feed stop 80 shall not in any way impair contour-following for this last traverse cycle, we show a connection 177 from one side of the supply line direct to contacts 178 (of stepping switch 140) representing an incremental depth of cut very substantially greater than any that will ever be made in a normal operation of the machine. This assures that when the mechanism senses that it has completed the last roughing cut (determined by the setting of the Number-of-Cuts selector 126), the Increment-Control stepping switch 140 will scan very much more than for any normally selected depth, and will step all the way up to the depth corresponding to placement of contact 178 before picking up increment complete relay R–4. This, of course, means that the inner stop 80 will be adavnced so far radially upward as not to intercept the link 52 during any strictly contour-following final cycle of the machine.

Upon completion of the final traverse from the template control, limit switch 111 will be operated. This has the immediate effect of dropping out the Spindle-Clutching relay R–2 and of exciting the cross-slide retract solenoid 102, thus retracting the cross-slide 24 and returning the carriage 17 back to starting position. At the same time, the normally closed contacts R–2–5 complete the circuit to feed motor reversing relay R–8 and the interrupter circuit to the Cut-Selector RESET coil 135, returning all arms of Cut Selector 130 back to the leftmost or reset position as seen in FIG. 3A. Also at the same time, normally closed contacts R–2–7 complete the circuit to the Depth-Totalizer subtract relay R–10 which through normally open contacts R–10–1 picks up feed stop drive relay R–5 to now drive the feed stop motor 90 in reverse, so that the Depth Totalizer may count itself back to the "zero" or start position and at the same time return the upper limit stop 80 back to starting position. Complete reset of the Depth Totalizer 150 is certified by excitation of relay R–9 which opens its contacts R–9–1 to drop out the Feed-Stop-Drive relay R–5, as well as relays R–6 and R–11, thus shutting down the automatic circuit and conditioning the same for recycled operation.

*Selective short carriage traverse cycle*

FIG. 6 shows a typical set-up for this type of operation. First, the sequence of operations must be set up at the control station seen in FIG. 4 as follows: four roughing cuts are required so the number of cuts selector 126 is set at dial position 4; the operator manually sets the first cut (by handwheel 84), at .120"; the second and third cut selectors 121–122 are set at the dial position for .120"; the fourth cut selector 123 is set at the dial position for .080. The cycle start is to be controlled by the first position limit switch LS–1 so, at the CARRIAGE TRAVERSE CONTROL section, the first position selector 206 is set at dial postion–1; both second and third cuts are identical and under control of limit switch LS–2 so the second and third position selectors 207, 208 are set at dial position–2; the fourth and longest cut is under the control of limit switch LS–3 so the fourth position selector 209 is set at dial position 3. The rotary selector switch 217 is now set at ON to tie in the short carriage traverse control circuit through limit switches LS–1, LS–2, LS–3, LS–4 which are now adjusted along switch rail 214 to provide carriage reversal at positions 1 through 4 as represented in FIGS. 6 and 8.

Assume now that the machine is at rest in the cycle start position as represented in FIG. 6 and the operator has manually set the tool slide for the first cut depth of .120 inch, and that a rough workpiece has been placed between centers. The operator presses CYCLE START switch 161 (FIG. 3) to energize SPINDLE CONTROL Relay R–2 and tool slide ADVANCE solenoid 103 to simultaneously start the spindle and advance the toolslide 24 which, through trip dog 114 displaces spool valve 197 fully leftward to start the carriage in rapid forward traverse until the tool approaches the workpiece whereupon it automatically shifts down to forward feed traverse. The normally closed R–2–8 contacts in the CARRIAGE STOP solenoid 201 circuit are now open but this circuit remains ready through the normally closed R–6–5 contacts. At the end of the first roughing cut the tracer 36 strikes the leftmost shoulder of the template 40 and energizes RECYCLE Relay R–3 to retract the toolslide 24 which, through trip dog 113 displaces spool valve rightward to shift the carriage 17 into rapid return traverse. Energization of R–3 also, through contacts R–3–3, steps the contact arms 131, 132, 133, 200 of stepping switch 130 ahead one step. Contact arm 200 of stepping switch 130 now drops limit switch LS–1 and picks up limit switch LS–2 which is closed on return carriage traverse by actuator 215, thus, through the contact arm of position 2 selector 207, energizing carriage stop solenoid 201. The energized solenoid 201 shifts the carriage drive into neutral (see FIG. 9) and then closes the normally open contacts 205' of limit switch 205 to energize ADVANCE solenoid 103, thereby advancing toolslide 24 for the next roughing cut. The counting and totalizing of the increments for the next roughing cut on the stepping switches 140 and 150 is initiated upon energization of RECYCLE relay R–3 the same as in the normal multi-cut cycle. The above short carriage traverse procedure is repeated for the 2nd, 3rd and 4th roughing cuts; it being understood that since the 2nd and 3rd cuts in the program require the same carriage travel, position 3 selector 208 is also set at dial position 2 as seen in FIGS. 3A and 4 so that limit switch LS–2 will be responsive upon two successive short carriage return traverses of the 2nd and 3rd roughing cuts. At the end of the third cut, relay R–3 again is energized, stepping switch arm 200 into coaction with traverse selector 209, so that the carriage will reverse to limit switch LS–3 and then proceed forwardly through the 4th cutting traverse. Upon completion of the 4th roughing cut, TEMPLATE DISCONNECT relay R–6 is energized through contact arm 132 at the number of cuts control level of stepping switch 130 and NUMBER OF CUTS selector 126 set for this program at dial position 4. From this point on, the template controlled finishing cut cycle is the same as in the normal multi-cut cycle. When the spindle is stopped upon de-energization of SPINDLE CONTROL relay R–2 its normally closed contacts R–2–8 close to alert the CARRIAGE STOP solenoid circuit, it being understood that normally closed parallel contacts R–6–5 were opened when TEMPLATE DISCONNECT relay R–6 was energized upon termination of forward carriage traverse of the last roughing cut. On the final return traverse the carriage stops at cycles start position with the actuator 215 holding LS–1 which, through CARRIAGE STOP solenoid 201, valve 202, cylinder 203 shifts the carriage drive into neutral then also holds limit switch 205 with its normally open contacts 205' closed, thereby alerting the circuit to tool slide ADVANCE solenoid 103 for the next machine cycle.

A number of safety features will be seen to be inherent in the described tool-positioning mechanism. For example, during automatic operation, the feed-stop-positioning lead screw 85 is always under positive control; it is either braked at 96, or it is being driven by motor 90. This means that at no time during automatic operation can an operator accidentally or otherwise change the position of stop 80 by manipulation of the hand-control knob 84.

As another feature of automatic operation, and should it become necessary at any time to terminate the cycle, a mere pressing of the Cycle-Stop button 159 is all that is necessary. This has the effect of returning all parts to starting position as described in connection with operation of limit switch 111.

It will be seen that we have described an improved automatic programming machine of the character indicated. While our mechanism is adaptable to any profiling type of machine, such as a milling machine or the like, it has been described in connection with a contour cutting lathe because it has a special application thereto. The mechanism provides extreme flexibility of set up and assures that at no time will a tool be called upon to remove more material than can be safely handled in any one roughing cut. There is assurance that there will be no wasted traverse motions. If necessary, only very short traverses will be made for certain depths of roughing cut. The mechanism lends itself, in addition to stepped cutting operations as described in connection with the workpiece 26, to tapered cuts as illustrated in FIG. 5, wherein five roughing cuts are made prior to the final traverse on the profile of the template, and wherein the material remaining for removal on the template-controlled final traverse is shown by the shaded area.

While we have described the invention in detail for the preferred form illustrated, it will be understood that modifications may be made within the scope of the invention as defined in the claims which follow.

We claim:

1. In a contour cutting machine, work-support means, elongated guide means, a carriage and means for actuating the same along the guide means to traverse work held by the work-support means, tool carrying means including a cross slide mounted on the carriage for movement transverse to the elongated guide means to position a tool for operating on the work, a template positioned to be traversed as the carriage traverses the work, the template having for such traverse a profile including upper and lower limits coresponding to desired ultimate limits of cut in the work, cross slide-feed means including template following means, manually operable selectively adjustable preset means operative on preliminary traversing of the work and limiting the maximum feed of the tool into the work to an extent intermediate said limits for said preliminary traversing, said adjustable preset means being effective to override said template following means as long as the instantaneous cut is short of substantially the desired local depth of cut, and means effective on termination of preliminary traversing for transferring control of the cross slide-feed means from the preset means to the template and its following means.

2. In a contour cutting machine, work-support means, elongated guide means, a carriage and means for actuating the same along the guide means to traverse work held by the work-support means, tool carrying means including a cross slide mounted on the carriage for movement transverse to the elongated guide means to position a tool for operating on the work, a template positioned to be traversed as the carriage traverses the work, the template having for such traverse a profile including upper and lower limits corresponding to desired ultimate limits of cut in the work, cross silde feed means including template following means, a plurality of manually operable selectively adjustable preset means operable respectively on consecutive preliminary traverses of the work, one preset means for selecting the maximum feed of the tool into the work to a selected extent intermediate said template profile limits for one preliminary traverse, another preset means for selecting the maximum feed of the tool into the work to a greater extent intermediate said limits for a next preliminary traverse of the work, each of said preset means being effective to maintain said template following means out of contact with said template as long as the instantaneous cut is short of substantially the desired local depth of cut, and means automatically effective under control of one after another of the plurality of preset means to determine adjustably selected successive roughing cuts on preliminary traverses of the work before the template following means determines a final contoured cut on a subsequent traverse of the work.

3. In a machine as defined in claim 2, means for detecting completion of each preliminary traverse and returning the cross slide to a start position for the subsequent traverse and means for disabling said detecting means during the template controlled traverse of the work.

4. In a machine as defined in claim 2, and automatic means responsive to completion of one preliminary traverse for returning the carriage to a reset position in readiness for a next traverse of the work, said automatic means successively transferring control of the cross slide-feed means from one said preset means to a next and then on completion of the last preliminary traverse transferring control from the last effective preset means to the template following means.

5. In a contour-cutting machine of the character indicated, work-support means, elongated traverse-guide means, a carriage and means for feeding the same along said traverse-guide means and relatively to said work-support means, across slide mounted on the carriage for movement generally transverse to said elongated guide means, tool-holder means carried by said cross slide for positioning a tool to operate on work held by said work-support means, a template positioned to be traversed as said carriage traverses work hel dby said work-support means, said template having for such traverse a profile including upper and lower limits corresponding to desired ultimate limits of cut in the work, cross-slide feed means including template-following means in controlling relation with said cross-slide feed means, preset means referenced to said carriage and independent of said template and operative on a given traverse of the work to limit maximum feed of the tool into the work to an extent intermediate said limits for said given traverse of the work, and automatic means operative during said given traverse of the work and responsive to coaction between said template and said template follower and including means for automatically terminating said given traverse upon such coaction.

6. The machine of claim 5, in which said last-defined means includes further means responsive to such coaction for automatically repositioning said carriage for commencement of a next traverse of the work.

7. The machine of claim 5, in which said last-defined means includes means automatically repositioning said carriage for commencement of a next traverse of the work and for also transferring control of said cross-slide feed means from said preset means to said template-following means.

8. The machine of claim 6, there being a plurality of such preset means respectively operative for consecutive traverses of the work, one preset means operative for limiting maximum feed of the tool into the work to one extent intermediate said limits for one of the latter traverses of the work and another preset means operative for limiting maximum feed of the tool into the work to a greater extent intermediate said limits for a next of the consecutive traverses, said automatic means being operative for terminating each of the consecutive traverses and repositioning the carriage for a succeeding traverse of the work.

9. The machine of claim 8, said automatic means further including means sequentially operating to transfer control of said cross-slide feed means from one said preset means to a next said preset means and from the last effective preset means to said template-following means.

10. In a contour-cutting machine of the character indicated, work-support means, elongated traverse-guide means, a carriage and means for feeding the same along said traverse-guide means and relatively to said work-support means, a cross slide mounted on the carriage for movement generally transverse to said elongated guide means, tool-holder means carried by said cross slide for positioning a tool to operate on work held by said work-support means, a template positioned to be traversed as said carriage traverses work held by said work-support means, said template having for such traverse a profile including upper and lower limits corresponding to desired ultimate limits of cut in the work, cross-slide feed means including template-following means in controlling relation with said cross-slide feed means, preset means operative on a given traverse of the work and limiting maximum feed of the tool into the work to an extent intermediate said limits for said given traverse of the work, automatic means operative during said given traverse of the work and responsive to coaction between said template and said template follower and including means for automatically terminating said given traverse upon such coaction, and an electrical circuit completed upon contact of said template-following means with the template during said given traverse of the work for bringing said automatic means into operation.

11. The machine of claim 10, said automatic means including means for automatically transferring control of said cross-slide feed means from said preset means to said template-following means.

12. In a contour-cutting machine of the character indicated, a frame, work-support means carried by said frame, elongated traverse-guide means on said frame, a traverse carriage and means for feeding the same along said traverse-guide means and relatively to said work-support means, a cross slide carried by said carriage and guided for movement generally transverse to said elongated guide means, tool-holder means carried by said cross slide for positioning a tool to operate on work held by said work-support means, a template fixedly positioned relatively to said frame and in electrically insulated relation therewith, the positioning thereof being such as to be traversed as said carriage traverses work held by said work-support means, said template having for such traverse a profile including upper and lower limits corresponding to desired ultimate limits of cut in the work, cross-slide feed means including template-following means in controlling relation with said feed means, and preset means operative on a first traverse of the work and limiting the maximum feed of the tool into the work to an extent intermediate said limits for said first traverse of the work, an electric circuit including said template and completed upon contact of said template-following means therewith, and means automatically responsive to completion of said circuit for transferring control of said feed means from said preset means to said template-following means.

13. In a contour-cutting machine of the character indicated, work-support means, elongated traverse-guide means, a traverse carriage and means for feeding the same along said traverse-guide means and relatively to said work-support means, a cross slide carried by said carriage and guided for movement generally transverse to said elongated guide means, tool-holder means carried by said cross slide for positioning a tool to operate on work held by said work-support means, a template positioned to be traversed as said carriage traverses work held by said work-support means, said template having for such traverse a profile including upper and lower limits corresponding to desired ultimate limits of cut in the work, said traverse feed means including means for feeding said carriage in a first direction for a cut on the work, and trip-operated recycling means for repositioning said carriage for commencement of a second cut in said first direction on the work, cross-slide feed means including template-following means in controlling relation with said cross-slide feed means, preset means referenced to said carriage and independent of said template and operative on a first traverse of the work to limit the maximum feed of the tool into the work to an extent intermediate said limits for said first traverse of the work, and means operative during a traverse of the work and responsive to coaction between said template and said template-following means and in operative relation with said trip-operated means, whereby upon such coaction said carriage is automatically recycled into position for a successive cut on the work, said last-defined means including means transferring control of said cross-slide feed means from said preset means to said template-following means.

14. In a contour-cutting machine of the character indicated, work-support means, elongated traverse-guide means, a traverse carriage and means for feeding the same along said traverse guide means and relatively to said work-support means, a cross slide carried by said carriage and guided for movement generally transverse to said elongated guide means, tool-holder means carried by said cross slide for positioning a tool to operate on work held by said work-support means, a template positioned to be traversed as said carriage traverses work held by said work-support means, said template having for such traverse a profile including upper and lower limits corresponding to desired ultimate limits of cut in the work, cross-slide feed means including template-following means in controlling relation with said feed means, and preset means operative for a given traverse of the work and limiting the maximum feed of the tool into the work to an extent intermediate said limits for said given traverse of the work, said preset means comprising an adjustably positionable abutment effectively in intercepting relation with said template-following means for positions thereof short of contour-following contact of said template-following means with said template and motor-operated means controlled by the preset means for positioning said abutment.

15. In the machine of claim 14, a plurality of preset abutment position-determining means respectively for controlling said motor-operated means to position the abutment for consecutive traverses of the work, and means responsive to coaction between the template and its follower means during one of these traverses for transferring control of the motor from one said preset position-determining means to another.

16. In the machine of claim 15, said last-defined means including a step switch automatically indexing from one of said position-determining means to another upon each successive coaction between the template and its follower means.

17. The machine of claim 16, including preset means selecting the number of position-determining means to be sequentially placed in controlling relation with said motor for recycled traverses of the work, and means operative on completion of the last of the preselected motor-operated positions of said abutment for transferring control of said cross-slide feed means from said abutment to said template-following means.

18. The machine of claim 16, including preset means selecting the number of position-determining means to be sequentially placed in controlling relation with said motor for recycled traverses of the work, and means operative on completion of the last of the preselected motor-operated positions of said abutment for advancing said abutment effectively beyond the lower template determined limit of cut, whereby, for the final traverse of the work, control of said cross-slide feed means is transferred from said abutment to said template-following means.

19. In a contour-cutting machine of the character indicated, work-support means, elongated traverse-guide means, a traverse carriage and means for feeding the same along said traverse guide means and relatively to said work-support means, a cross slide carried by said carriage and guided for movement generally transverse to said elongated guide means, tool-holder means carried by said cross slide for positioning a tool to operate on work held by said work-support means, a template positioned to be traversed as said carriage traverses work held by said work-support means, said template having for such traverse a profile including upper and lower limits corresponding to desired ultimate limits of cut in the work, cross-slide feed means including template-following means in controlling relation with said feed means, and preset means operative on a first traverse of the work and limiting the maximum feed of the tool into the work to an extent intermediate said limits for said first traverse of the work, an electric circuit completed on contact of said template-following means with said template and operative upon completion to reset said carriage for a successive traverse of the work and to transfer control of said cross-slide feed means from said preset means to said template-following means, said last-defined means including means disconnecting said electric circuit upon such transfer of control, whereby the final traverse of the work can safely follow the template with continuous contact of the template-following means therewith.

20. The machine of claim 19, and including manually operable cycle-stop means effective at any time during automatic operation of said machine to return said tool to its initial position in readiness to start its first cutting traverse.

21. The machine of claim 18, and including means operative upon completion of a template-controlled traverse for resetting said abutment back to the initial position thereof.

22. In a machine tool, work-support means, a tool holder adjustable transversely of the work-support means to position a tool for operating on work held by the work-support means, and transverse adjusting means for the tool holder comprising a control part positionable for determining the transverse adjustment of the tool holder, a positioning shaft for said part, a counting motor having an output shaft, clutch and brake mechanism for alternately coupling said positioning shaft to said output shaft and for holding said positioning shaft against rotation, pulse generator means connected to said output shaft and developing electrical counting pulses synchronized with rotation of said output shaft, counting mechanism including selectively operable means for presetting the same, said counting mechanism being connected to said pulse generator and responding thereto to index one count for each pulse generated, said counting mechanism having a first counting condition as long as the preselected count has not been achieved, said counting mechanism having a second non-counting condition as long as the preselected count has been achieved, means responsive to said first condition for engaging said clutch to the exclusion of said brake, and means responsive to said second condition for engaging said brake to the exclusion of said clutch, whereby on achievement of the selected count said part will have been positioned in accordance with the selected count.

23. The combination of claim 22, in which said counting mechanism includes a plurality of selectively operable means for presetting separate counts, indexing means for sequentially rendering said respective selectively operable means effective to control said counting mechanism, and externally operative means in controlling relation with said indexing means, whereby said part will be variously positioned in accordance with various preselected counts whenever said externally operative means is operated.

24. In a contour-cutting machine of the character indicated, work-support means, elongated traverse-guide means, a carriage and means for feeding the same along said traverse-guide means and relatively to said work-support means, a cross slide carried by said carriage and guided for movement generally transverse to said elongated guide means, tool-holder means carried by said cross slide for positioning a tool to operate on work held by said work-support means, a template positioned to be traversed as said traverse slide traverses work held by said work-support means, said template having for such traverse a profile including upper and lower limits corresponding to desired ultimate limits of cut in the work, cross-slide feed means including template following means in controlling relation with said cross-slide feed means, a positioning shaft to position said template-following means, a counting motor having an output shaft, clutch and brake mechanism for alternately coupling said positioning shaft to said output shaft and for holding said positioning shaft against rotation, pulse generator means connected to said output shaft and developing electrical counting pulses synchronized with rotation of said output shaft, counting mechanism including selectively operable means for presetting the same, said counting mechanism being connected to said pulse generator and responding thereto to index one count for each pulse generated, said counting mechanism having a first counting condition as long as the preselected count has not been achieved, said counting mechanism having a second non-counting condition as long as the preselected count has been achieved, means responsive to said first condition for engaging said clutch to the exclusion of said brake, and means responsive to said second condition for engaging said brake to the exclusion of said clutch, whereby on achievement of the selected count, said tool-holder means will have been positioned with respect to said work-support means in accordance with the selected count.

25. In a contour-cutting machine of the character indicated, work-support means, elongated traverse-guide means, a carriage and means for feeding the same along said traverse-guide means and relatively to said work-support means, a cross slide carried by said carriage and guided for movement generally transverse to said elongated guide means, tool-holder means carried by said cross slide for positioning a tool to operate on work held by said work-support means, a template positioned to be traversed as said traverse slide traverses work held by said work-support means, said template having for such traverse a profile including upper and lower limits corresponding to desired ultimate limits of cut in the work, cross-slide feed means including template following means in controlling relation with said cross-slide feed means, a positioning shaft to position said template-following means, a counting motor having an output shaft, clutch and brake mechanism for alternately coupling said positioning shaft to said output shaft and for holding said positioning shaft against rotation, pulse generator means connected to said output shaft and developing electrical counting pulses synchronized with rotation of said output shaft, counting mechanism including selectively operable means for presetting the same, said counting mechanism being connected to said pulse generator and responding thereto to index one count for each pulse generated, said counting mechanism having a first counting condition as long as the preselected count has not been achieved, said counting mechanism having a second non-counting condition as long as the preselected count has been achieved, means responsive to said first condition for engaging said clutch to the exclusion of said brake, means responsive to said second condition for engaging said brake to the exclusion of said clutch, whereby on achievement of the selected count, said tool-holder means will have been positioned in accordance with the selected count, said counting mechanism including a plurality of selectively operable means for presetting separate counts, indexing means for sequentially rendering said respective selectively operable means effective to control said counting mechanism, and externally operative means in controlling relation with said indexing means, whereby said tool-holder means will be variously positioned in accordance with various preselected counts whenever said externally operative means is operated.

26. In a multi-cut cycled contour cutting machine, work-support means, a work traversing carriage and means to drive the carriage through forward and return traverses along the work, a tool holder mounted by the cariage for transverse adjustments relative to the work to position a tool in required cutting depth operational relation to the work during successive forward traverses of the carriage in the multi-cut cycle, a template having a profile between maximum and minimum depths of cut, preset means independent of said template for establishing a preset depth of cut short of said maximum depth as long as the instantaneous depth of cut is short of the template-determined depth, means including said template for governing transverse adjustments of the tool holder for the successive forward traverses of the carriage, means operable to reverse the carriage, and means including the template for programming the operation of said reversing means during the cycle.

27. In a multi-cut cycled cutting machine of the character indicated, a carriage reciprocable along the work through forward and return traverses and mounting a tool for cutting operation on the work during the forward traverse, means for operating the carriage through a cyclic succession of reciprocations, means for indexing the reciprocations in the cyclic succession, means for indexing positions of the carriage in its traverse range, settable start position selecting means, and means controlled conjointly by the reciprocation indexing means, the carriage position indexing means and the start position selecting means for selectively establishing start positions for the forward traverses in the cyclic succession of reciprocations of the carriage.

28. As in claim 27, the start position selecting means including a plurality of variably settable selectors, one to each reciprocation in the cyclic succession, successively brought into start position selecting control by the reciprocation indexing means.

29. As in claim 27, the start position selecting means including a plurality of individual selectively settable start position selectors respectively allocated to successive reciprocations of the carriage in the cycle and successively brought into start position selecting control by the reciprocation indexing means, each said selector being capable of selecting any one of a plurality of start positions whereby successive reciprocations of the carriage in the cycle may start from the same or different positions, as determined by the settings of the selectors.

30. As in claim 29, the start position selectors each being a multi-position switch settable to any of different positions indicative of different start positions for the carriage.

31. As in claim 27, the carriage position indexing means comprising a plurality of switches spaced correspondingly to start positions for the carriage and means for effectively operating said switches upon return traversing of the carriage.

32. As in claim 31, the means for operating the switches comprising a member carried by the carriage and the switches being spaced along the path of said member and of the one-way type for effective actuation only during return traversing of the carriage.

33. In a multi-cut cycled cutting machine, work-support means, a carriage reciprocable along the work through forward and return traverses and carrying a tool for operating on the work during the forward traverse, means for operating the carriage through a cyclic succession of reciprocations, electrical elements for indexing start positions for the forward traverses in the cyclic succession, an electrical counter for counting the reciprocations in the cyclic succession, electrical start position selectors respectively allocated to the successive reciprocations, stop means for arresting return traverse of the carriage, and a circuit controlled by the start position selectors, the start position indexing elements and the counter for operating the stop means.

34. In a multi-cut cycled cutting machine, work-support means, a carriage reciprocable along the work through forward and return traverses and carrying a tool for operating on the work during the forward traverse, means for programming the carriage through a cycle of a selected number of reciprocations from selective start positions in the traverse range of the carriage and including a cycle start position intermediate the traverse range, the programming means including a counter, means effective at the end of each forward traverse except the last in the cycle for producing a step of advance of the counter, means effective when the last forward traverse in the cycle has been completed for resetting the counter, and means controlled by the counter in reset status for stopping the final return traverse of the carriage in the cycle at said cycle start position to establish the start position for the first forward traverse in the next such cycle.

35. In a contour cutting lathe, a frame, work-support means carried by the frame, a carriage reciprocable on the frame through forward and return traverses along the work, a tool holder supported by the carriage for transverse adjustment relative to the work to position a tool in desired cutting depth relation to the work during forward traversing of the carriage, means for automatically operating the carriage through successive reciprocations involving in the last reciprocation a finishing cut forward traverse and in the preceding reciprocation a roughing cut forward traverse, means for governing cutting depth adjustment of the tool holder and including a template traversed by the carriage in the finishing cut traverse for contour-controlling the adjustment of the tool holder, stop means effective after the roughing cut traverse for stopping the ensuing return traverse of the carriage at a reset position marking the beginning of the finishing cut traverse, and other stop means effective after the finishing cut traverse for stopping the return traverse of the carriage at a position spaced from said reset position.

36. As in claim 35, including means for retracting the tool holder, so as to retract the tool from the work, during return traversing of the carriage, a device operable at the end of the return traverse for advancing the tool holder into controlled coaction with the cutting depth governing means, means effective conjunctively with the first mentioned stop means for activating said device, and alternative means effective conjunctively with the second mentioned stop means for similarly activating said device.

37. In a multi-cut cycled contour cutting lathe, a frame, work-support means carried thereby, a carriage reciprocable on the frame through forward and return traverses along the work, a tool holder supported by the carriage for transverse adjustment relative to the work to position a tool in desired cutting depth relation to the work during forward traversing of the carriage, means for operating the carriage through a cycle of reciprocations involving a selected number of roughing cut forward traverses and a final, finishing cut forward traverse, means for governing transverse adjustment of the tool holder during the cycle and including a template traversed by the carriage in the final, finishing cut traverse for contour-controlling the tool holder adjustment, start position program means for stopping the return traverse of the carriage after a roughing cut traverse at a selected start position for the next roughing cut traverse, said selected start position being intermediate the template traversing range of the carriage, other means effective after the last roughing cut traverse of the cycle for stopping return traversing of the carriage at a predetermined reset position marking the beginning of the final, finishing cut traverse of the cycle, and means effective after the finishing cut traverse for rendering said program means effective to stop the ensuing return traverse of the carriage at a selected cycle start position intermediate the template traversing range and marking the start position for the first roughing cut traverse in a next-multi-cut cycle.

38. In a multi-cut cycled contour cutting lathe, a frame, work-support means carried by the frame, a carriage slidably guided on the frame so as to be reciprocable through forward and return traverses along the work, a tool holder adjustable on the carriage transversely of the work for positioning a tool in required cutting depth relation to the work during a forward traverse of the carriage, means to govern adjustment of the tool holder and including a template for contour-controlling the tool held, and means for cycling the carriage through automatically successive reciprocations involving at least one relatively long forward cutting traverse completely spanning the template and the work and one or more shorter forward, cutting traverses starting intermediate the template traversing range of the carriage and during which the tool traverses the work only partially, the cycling means including means for programming different start positions for the relatively longer and shorter forward, cutting traverses of the carriage during the cycle.

References Cited by the Examiner
UNITED STATES PATENTS

| | | | |
|---|---|---|---|
| 2,645,148 | 7/1953 | Von Zelewsky | 82—14 |
| 2,645,149 | 7/1953 | Von Zelewsky | 82—14 |
| 2,913,945 | 11/1959 | Granberg et al. | 82—14 |
| 2,943,251 | 6/1960 | Hull | 318—162 |
| 3,069,608 | 12/1962 | Forrester et al. | 318—162 |

WILLIAM W. DYER, JR., *Primary Examiner.*

LEON PEAR, *Examiner.*